United States Patent
Cao et al.

(10) Patent No.: US 11,956,679 B2
(45) Date of Patent: Apr. 9, 2024

(54) SENSING AND RESOURCE SELECTION BASED ON PRIORITIES FOR SIDELINK TRANSMISSIONS

(71) Applicant: Huawei Technologies Co., Ltd., Shenzhen (CN)

(72) Inventors: Yu Cao, Ottawa (CA); Amine Maaref, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 16/989,273

(22) Filed: Aug. 10, 2020

(65) Prior Publication Data

US 2021/0051525 A1     Feb. 18, 2021

Related U.S. Application Data

(60) Provisional application No. 62/888,430, filed on Aug. 16, 2019.

(51) Int. Cl.
| | |
|---|---|
| *H04W 28/26* | (2009.01) |
| *H04B 17/318* | (2015.01) |
| *H04W 4/40* | (2018.01) |
| *H04W 24/10* | (2009.01) |
| *H04W 72/02* | (2009.01) |
| *H04W 72/0446* | (2023.01) |
| *H04W 72/0453* | (2023.01) |

(Continued)

(52) U.S. Cl.
CPC .......... *H04W 28/26* (2013.01); *H04B 17/318* (2015.01); *H04W 4/40* (2018.02); *H04W 24/10* (2013.01); *H04W 72/02* (2013.01); *H04W 72/0446* (2013.01); *H04W 72/0453* (2013.01); *H04W 72/56* (2023.01); *H04W 92/18* (2013.01)

(58) Field of Classification Search
None
See application file for complete search history.

(56) References Cited

U.S. PATENT DOCUMENTS

| | | |
|---|---|---|
| 2018/0098323 A1 | 4/2018 | Zhang et al. |
| 2019/0174547 A1* | 6/2019 | Khoryaev ......... H04W 28/0284 |

(Continued)

FOREIGN PATENT DOCUMENTS

| | | |
|---|---|---|
| WO | 2018031086 A1 | 2/2018 |
| WO | 2019148376 A1 | 8/2019 |

OTHER PUBLICATIONS

Sony, Discussion on NR V2X mode 2 resource allocation. 3GPP TSG RAN WG1 #96bis, Xi an, China, Apr. 8 Apr. 12, 2019, R1-1904256, 5 pages.

(Continued)

*Primary Examiner* — Chi H Pham
*Assistant Examiner* — Raul Rivas
(74) *Attorney, Agent, or Firm* — Slater Matsil, LLP

(57) ABSTRACT

A method that includes sensing, by a first user equipment (UE), a signal transmitted by a second UE indicating a resource reservation for a shared channel for a sidelink (SL) transmission by the second UE and a priority associated with the SL transmission; determining, by the first UE, a threshold based on a type of the SL transmission and the priority; and selecting, by the first UE, a resource in the shared channel to use for a SL transmission by the first UE based on the threshold.

18 Claims, 8 Drawing Sheets

(51) Int. Cl.
  *H04W 72/56* (2023.01)
  *H04W 92/18* (2009.01)

(56) References Cited

U.S. PATENT DOCUMENTS

2019/0182840 A1    6/2019  Feng et al.
2019/0208441 A1*   7/2019  Wang .................... H04W 24/10
2019/0306923 A1*  10/2019  Xiong ................... H04L 27/261

OTHER PUBLICATIONS

Intel Corporation, Sidelink Resource Allocation Mode-2 Design for NR V2X Communication. 3GPP TSG RAN WG1 Meeting #97, Reno, USA, May 13-17, 2019, R1-1906796, 18 pages.
Intel Corporation, "Summary#2 for AI 7.2.4.2.2 Mode-2 Resource Allocation", 3GPP TSG RAN WG1 Meeting #97, R1-1907771, May 13-17, 2019, 26 Pages, Reno, USA.
RP-190984, "Revised WID on 5G V2X with NR sidelink", LG Electronics, RAN#84, Newport Beach, USA, Jun. 2019.
Chairman's Notes, 3GPP RAN1 #1901.
TR 38.885 v16.0.0, "Study on Vehicle-to-Everything (Release 16)".
R1-1900026, "Sidelink resource allocation mode 2", Huawei, HiSilicon, RAN1 Adhoc#1901, Taipei, Taiwan, Jan. 2019.
R1-1905334, "Discussion of Resource Allocation for Sidelink—Mode 2", Nokia, Nokia Shanghai Bell, RAN1#94, Xi'An, China, Apr. 2019.
R1-1808937, "Sidelink control channel design of NR V2X", Huawei, HiSilicon, RAN1#94, Gothenburg, Sweden, Aug. 2018.
R1-1900043, "PDCCH Enhancements for URLLC", Huawei, HiSilicon, RAN1#1901, Taipei, Taiwan, Jan. 2019.
TS 22.186, "Enhancement of 3GPP support for V2X scenarios; Stage 1".
R1-1901540, "Sidelink resource allocation mode 2", 3GPP TSG RAN WG1 Meeting #96, Athens, Greece, Feb. 25-Mar. 1, 2019.
R1-198041, "NR Sidelink resource allocation mode 1", Huawei, HiSilicon, RAN1 #98, Prague, Czech Republic, Aug. 26-30, 2019.

* cited by examiner

SENSING AND RESOURCE SELECTION BASED ON PRIORITIES FOR SIDELINK TRANSMISSIONS

CROSS-REFERENCE TO RELATED APPLICATIONS

This application claims the benefit of and priority to U.S. Provisional Patent Application No. 62/888,430 filed Aug. 16, 2019, entitled "SENSING AND RESOURCE SELECTION BASED ON PRIORITIES FOR SIDELINK TRANSMISSIONS", the contents of which are incorporated herein by reference.

FIELD

The Application relates to methods and apparatus for sidelink (SL) transmission and resource allocation.

BACKGROUND

Vehicle to everything (V2X) refers to a category of communications scenarios that can include, among other things, communication between a vehicle and another vehicle (V2V), vehicle to infrastructure (V2I), vehicle to pedestrian (V2P), vehicle to network (V2N) and other scenarios. In V2X, the transmission can be done through a link between a network and a user equipment (UE), such as uplink (UL) and downlink (DL), or through a sidelink (SL) between UE and UE. UE cooperation can be used to enhance the reliability, throughput, and capacity of V2X communications, as well as next generation wireless communications in general.

Current Long Term Evolution (LTE) standards define an LTE V2X transmission scheme that relies on the concept of a transmit and receive resource pool (RP). A resource pool includes a set of time-frequency resources which can be contiguous or non-contiguous in time and or frequency. The resource pool may consist of sub-channels where a sub-channel consists of a group of contiguous resource blocks (RBs) in a same subframe. The current LTE V2X transmission scheme includes two transmission modes: mode 3 and mode 4. In mode 3, a base station (BS) schedules time-frequency resources (from the UE's resource pool) for SL transmission using downlink control information (DCI), either dynamically or semi-persistently. In mode 4, UE randomly selects resources within its transmit RP. A UE may also reselect resources based on previous measurement and sensing results.

The conventional resource pool approach specified by the current LTE V2X transmission scheme has drawbacks and limitations. For example, the scheduling in mode 3 results in scheduling-related limitations, such as latency and having the SL transmission rely on DCI. Furthermore, the design of LTE mode 4 relies on sensing and reservation to avoid collisions or resource conflicts between autonomous UE transmissions and therefore does not efficiently exploit radio resources. Additionally, LTE mode 4 is mainly targeted to handle periodic traffic and may be suboptimal for aperiodic traffic.

New V2X schemes are being developed. For example, the $3^{rd}$ Generation Partnership Project (3GPP) is now working on Release 16 New Radio (NR) V2X standardization. NR V2X contemplates two SL transmission modes, mode 1 and mode 2. In NR V2X SL mode 1, the BS controls SL transmission by a UE the UE. NR V2X SL Mode 1 includes dynamic scheduling and SL configured grant transmission. SL Configured grant transmission includes a Type 1 SL configured grant transmission where the configured grant is signaled in radio resource control (RRC) signaling and a Type 2 SL configured grant transmission where the resource for configured grant transmission is signaled in a combination of RRC and DCI signaling.

In NR V2X SL mode 2, the UE performs sensing and autonomously selects a resource from a set of candidate resources that are included in a configured or preconfigured resource pool. NR Release 16 is expected to include an agreement for a Mode 2 grant free (GF) transmission scheme that includes a sensing procedure performed at a UE that may use sidelink control information (SCI) sent over a physical sidelink control channel (PSCCH) by other UEs, and/or physical sidelink shared channel (PSSCH) measurements to determine resource(s) for SL transmission. However, many details of the proposed sensing and resource selection scheme are currently undeveloped and have been designated as topics for further study.

Accordingly, methods and systems for resource selection for sidelink (SL) transmissions based on sensed information are desired, including methods and systems that can mitigate against collisions among UE transmissions and thus improve the reliability of data transmissions.

SUMMARY

The present disclosure provides methods and systems for selecting resources at a sensing UE based on a priority of a packet which will be transmitted by a transmitting UE. The priority of the packet to be transmitted by the transmitting UE is indicated in an indication signal. A sensing UE may determine whether to consider a resource reservation by the transmitting UE by calculating a priority value for the resource reservation that depends on the type of transmission that the resource reservation is being made in respect of. If the sensing UE determines that the resource reservation is to be considered, resources for a transmission by the sensing UE will be selected to avoid potential collision with resources reserved for the indicated reservation type. Such a method may help to reduce potential collisions between the SL data retransmissions of different UEs and may enable the latency to be lower in V2X transmissions.

According to a first example aspect of the disclosure is a method that includes: sensing, by a first user equipment (UE), a signal transmitted by a second UE indicating a resource reservation for a shared channel for a sidelink (SL) transmission by the second UE and a priority associated with the SL transmission; determining, by the first UE, a threshold based on a type of the SL transmission and the priority; and selecting, by the first UE, a resource in the shared channel to use for a SL transmission by the first UE based on the threshold.

In at least some examples of the preceding aspect, the threshold specifies a signal power, and the method comprises measuring a signal power in the shared channel in respect of a resource indicated in the resource reservation, and selecting the resource to use for the SL transmission by the first UE comprises excluding the resource indicated in the resource reservation if the measured signal power exceeds the threshold.

In at least some examples of one or more of the preceding aspects, the priority indicates a priority level of data for the SL transmission by the second UE, and determining the threshold comprises: adjusting the priority based on the type of SL transmission that the resource reservation has been indicated in respect of; and selecting the threshold by mapping the adjusted priority to a respective threshold.

In at least some examples of one or more of the preceding aspects, a set of candidate resources are predefined for the shared channel, and excluding the resource indicated in the resource reservation comprises excluding the resource from the set of candidate resources and selecting the resource in the shared channel for the SL transmission by the first UE comprises selecting a resource from candidate resources remaining in the set of candidate resources.

In at least some examples of one or more of the preceding aspects the resource includes a time/frequency resource.

In at least some examples of one or more of the preceding aspects, the type of SL transmission that the resource reservation is indicated for is selected from a group that includes: (i) a blind SL retransmission of a previously transmitted transmission block; (ii) a future SL transmission of a second TB that is to follow transmission of a first, different, TB for which a resource reservation is also indicated in the signal transmitted by the second UE indicating the resource reservation for the second TB; and (iii) a feedback-based SL transmission of a TB that is a feedback-based version of a previously transmitted TB, wherein each of (i), (ii) and (iii) are associated with a different threshold.

In at least some examples of one or more of the preceding aspects, the signal transmitted by the second UE indicating the resource reservation also indicates a resource reservation type that corresponds to the type of the SL transmission.

In at least some examples of one or more of the preceding aspects, the shared channel is a shared data channel, and the signal transmitted by the second UE indicating the resource reservation is included in information sent over a shared control channel.

In at least some examples of one or more of the preceding aspects, the method includes sending, by the first UE, a signal indicating a resource reservation for the SL transmission by the second UE.

According to a further example aspect a first user equipment (UE) is disclosed that includes a non-transitory memory storage comprising instructions; a communication subsystem for communicating wirelessly with other UEs; and one or more processors in communication with the memory and communication subsystem. The one or more processors execute the instructions to configure the first UE to: sense, using the communication subsystem, a signal transmitted by a second UE indicating a resource reservation for a shared channel for a sidelink (SL) transmission by the second UE and a priority associated with the SL transmission; determine a threshold based on a type of the SL transmission and the priority; and select a resource in the shared channel to use for a SL transmission by the first UE based on the threshold.

According to a further example aspect is a non-volatile computer readable medium that stores computer instructions that configure a processor of a first UE to: sense, using a communication subsystem, a signal transmitted by a second UE indicating a resource reservation for a shared channel for a sidelink (SL) transmission by the second UE and a priority associated with the SL transmission; determine a threshold based on a type of the SL transmission and the priority; and select a resource in the shared channel to use for a SL transmission by the first UE based on the threshold.

According to a further example aspect, a method for resource reservation is provided. The method comprises: an indication signal from a second user equipment (UE) is sensed by a first UE, the indication signal indicating a resource reservation for a sidelink (SL) transmission and a priority associated with the resource reservation; and resources are selected by the first UE to use for a transmission by the first UE based on the priority included in the sensed indication signal and a type of the SL transmission.

According to a further example aspect, a method for resource reservation is provided. The method comprises: an indication signal from a second user equipment (UE) is sensed by a first UE, the indication signal indicates a priority of a packet that will be transmitted using resources reserved at a reservation type; and resources are selected by the first UE to use for a transmission by the first UE based on the priority of the packet and the reservation type.

According to another aspect of the present disclosure, there is provided a user equipment comprising a processor and memory and at least one antenna, the UE configured to perform the method as described herein.

BRIEF DESCRIPTION OF THE DRAWINGS

Embodiments of the disclosure will now be described with reference to the attached drawings in which.

Similar reference numerals may have been used in different figures to denote similar components.

DETAILED DESCRIPTION

Figure 1:
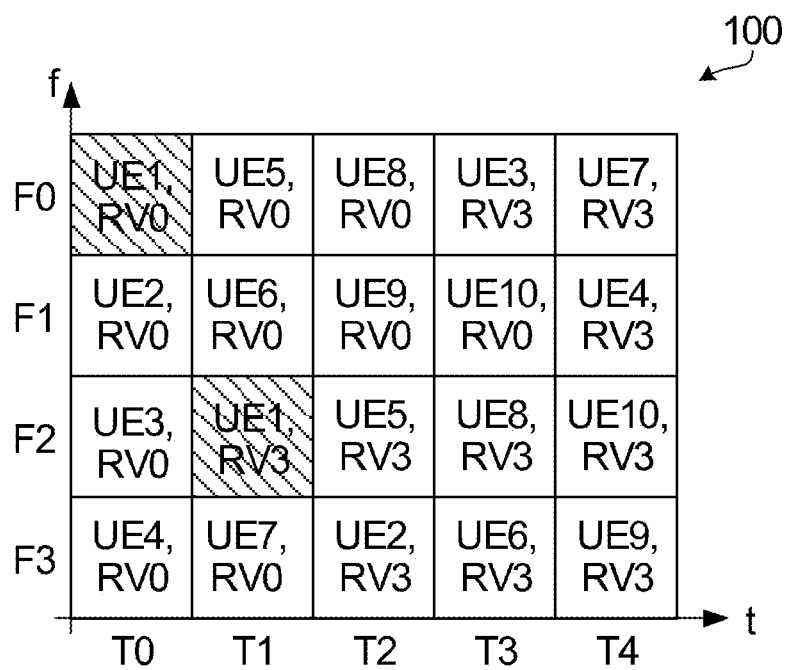
FIG. 1 is a block diagram illustrating an example of a two-dimensional resource configuration for SL transmission.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

Example embodiments described herein may be applied to, among other things, NR V2X SL communications. In some V2X scenarios, such as NR V2X mode 2, SL resource allocation is based on sensing and resource selection procedures. In NR V2X mode 2 transmission, a UE may autonomously select SL resources for SL transmission within configured or preconfigured resource pools (RPs) or within pre-configured resources within RPs. However, as NR requires high reliability and may include more than 2 retransmissions, potential SL transmission collisions between the transmissions of multiple UEs may arise when a UE selects SL transmission resources that may be reserved by the other UEs, which may cause lower reliability and high latency.

Accordingly, the present disclosure describes example methods for selecting resources based on different priority levels that are dependent on different types of resource reservations. In particular, different priority values are assigned to resource reservations based on the types of transmissions that the reservation is being made in respect of. Accordingly, the "type of resource reservation" corresponds to the type of transmission that the resource is being reserved in respect of. For example, different priority levels may be respectively assigned to the following types of resource reservations that are associated with different types of transmissions: (i) resource reservation for blind retransmission; (ii) Long term resource reservation for future transmission of different transport blocks (TBs); (iii) resource reservation for feedback-based retransmission; (iv) resource reservation for future transmission of an explicitly specified number of TBs; and (v) resource reservation for an initial transmission of a TB using a standalone advance control signal preceding initial transmission of the TB. In example embodiments, the respective priority levels associated with each type of resource reservation are configured or preconfigured or predefined. A UE requesting a resource reservation can transmit a priority indicator that identifies the resource reservation, and either explicitly or implicitly identifies the resource reservation type. As noted above, each different type of resource reservation that the UE is requesting can have a different priority value. Other UEs can sense the priorities and make resource selections for their own transmissions based on the sensed priorities.

In some examples, the disclosed methods and systems may help to avoid any potential SL transmission collisions and thus improve reliability. In some examples, a flexible start time for starting a selection procedure using a selection window and flexible length of the selection window may improve flexibility of SL transmissions and reduce latency.

FIG. 1 illustrates a resource grid showing an example of two-dimensional resource configurations available for SL transmissions for different UEs (e.g., 10 UEs in FIG. 1), which may be applied in NR V2X. In an example embodiment, the resource grid of FIG. 1 represents transmission resources available in physical sidelink shared channel (PSSCH) (i.e., a shared data channel). In this regard, the time-frequency resource grid of FIG. 1 represents a resource pool (RP) 100 that includes frequency-domain resources F0, F1, F2 and F3 and time-domain resources T0, T1, T2, T3 and T4. Each combination of frequency-domain resource and time-domain resource forms a transmission resource for an SL transmission. The RP 100 shown in FIG. 1, illustrates a pool of transmission resources that are potentially available for SL transmissions by different UEs within transmission pattern window. Each transmission resource represents a potential data transmission of a transport block (TB). In example embodiments, a UE may use multiple transmission resources based on a selection of one or more configured or preconfigured transmission patterns (e.g. time-frequency resource patterns (TFRPs) or time frequency repetition patterns). In the case of UE1, the illustrated transmission pattern represented in FIG. 1 includes two time-frequency transmission resources (eg. T0, F0 and T1, F2, as indicated in crosshatch) that can be used by UE1 to transmit a TB. A redundancy version (RV) for each transmission resource is also shown (RV0 or RV3). In FIG. 1, the transmission pattern for UE1 provides UE1 with communication resources to transmit a TB twice over the length of the transmission pattern window duration (for example a first retransmission of a TB followed by a second retransmission of the TB). Thus, the repetition number, K, for the transmission pattern for UE1 is 2. The grid of FIG. 1 illustrates ten respective transmission patterns, each of which includes two respective communication resources. Thus, RP 100 includes a pool of 10 transmission patterns, each of which includes 2 transmission resources. In some examples, K can be 1, or can be greater than 2.

As presented in FIG. 1, the RP 100 has a frequency-domain length of 4 and a time-domain length of 5. In the time-domain, time durations T0 to T4 could be slots, mini-slots, symbols, or any other quantization or unit of time. In the frequency-domain, frequency durations F0 to F3 could be frequency sub-channels, combinations of sub-channels, resource blocks (RBs), resource block groups (RBGs), bandwidth parts (BWPs), subcarriers, a number of subcarriers, carriers or any other quantization or unit of frequency. Furthermore, different frequency domain sub-channels are just an example. Sub-channels can instead be associated with different layers of non-orthogonal multiple access (NOMA), different pilot resources, and/or other resources. As described above, a transmission resource refers to a communication resource includes at least time and frequency resources (e.g. a time duration and frequency bandwidth) to transmit a TB. In some other examples, the transmission resources could also or instead include code-domain resources (such as sparse code multiple access), space-domain resources, and/or different demodulation reference signals (DMRS). Moreover, the transmission resources are not limited to two-dimensions, and therefore could include a number of dimensions greater or less than two.

In example embodiments, each UE in a group of UEs may be configured with multiple transmission parameter sets or multiple configurations that form a candidate set of transmission parameter sets that the UE can select from for SL V2X transmissions. Each transmission parameter set may define: transmission resources (e.g. time/frequency location), periodicity, frequency sub-channel definition, DMRS/preamble, transmission pattern (e.g. TRFP), SCI location, modulation code scheme (MCS), repetition number K, hybrid automatic repeat request (HARQ) process related parameters, and feedback channel indicator, among other things. In some example embodiments, each transmission parameter set is associated with a DMRS that can be used to determine the other properties of the transmission parameter set, for example transmission resources. Accordingly, each UE can be configured or preconfigured with a pool of candidate transmission patterns.

In example embodiments, a NR V2X SL communication may be established by performing a series of procedures that are configured to select communication resources that are not reserved by other UEs to transmit data, thereby mitigating against collisions. The series of procedures comprise: a configuration procedure, an initialization procedure, a resource indication procedure, a sensing procedure, a resource selection procedure, and a transmission procedure, which will be described respectively in greater detail below.

Configuration Procedure: Regarding the configuration procedure, each UE (e.g., for example each UE in a UE group 520 as described in greater detail below with reference to FIG. 5) may have a default initial transmission parameter set (e.g., defining initial transmission resources/patterns) or may otherwise be configured prior to transmitting a TB with an initial transmission parameter set to use for that TB. In some examples, each UE may be configured or preconfigured with an RP, such as an RP 100 that includes the transmission pattern pool (e.g. TFRP pool) shown in FIG. 1. In such cases, the initial transmission parameter set may include periodicity, length of a selection window, number of the repetition, size (e.g., time-domain length and frequency-domain length) of each resource for data transmission in the RP, etc. As noted above, in example embodiments different priority levels are associated with different types of resource reservations. In example embodiments, the UEs are configured or preconfigured with information that defines the relative priority levels for different types of resource reservations.

Figure 8:
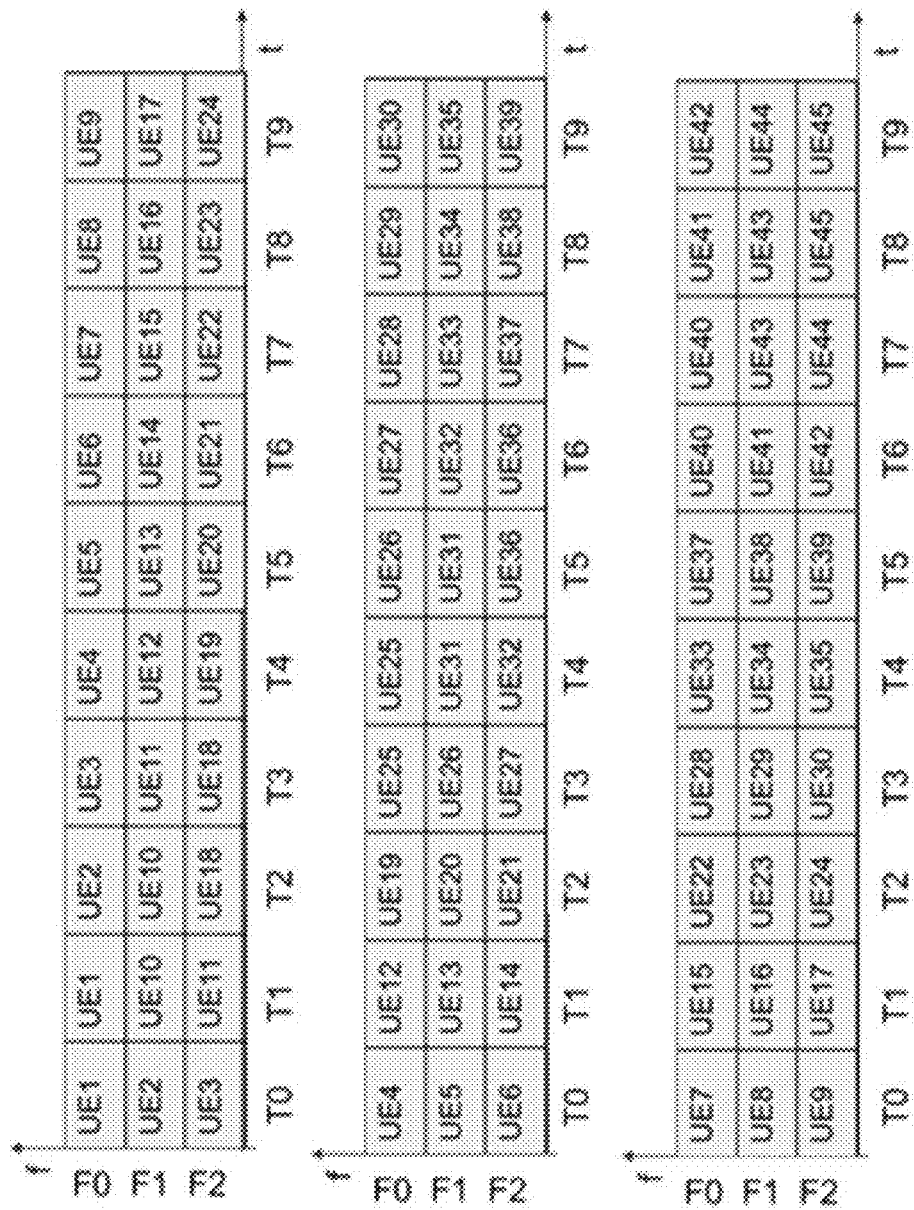
FIG. 8 is a schematic diagram illustrating an example of partially overlapping TFRP pool.

In some examples, during the configuration procedure, a UE is configured with a TFRP pool and possibly an initial/default TFRP. The TFRP pool configuration should include at least a periodicity and offset (starting slot). TFRP pool can repeat itself in a non-overlapping way. An example of TFRP configuration can be a non-overlapping TFRP pool defined in FIG. 1, which repeats itself every 5 slots (periodicity=5 slots) and offset is the starting slot number of the TFRP window/period, or a partially overlapping TFRP pool. In some examples, the partially overlapping TFRP pool may have a periodicity of 10 slots, as shown in FIG. 8. As the TFRPs in this case are non-overlapped (orthogonal), then in the specific case where flexible TFRP starting location is supported, only 1 bit of information carried by DMRS is needed to indicate whether the detected PSSCH corresponds to an initial transmission or a retransmission. In the case where TFRP pool is a partial overlapping TFRP pool, only 3 options (<2 bits) would need to be indicated by DMRS for sensing purposes as the location of PSSCH associated with the DMRS is already known. This can be done by setting a mapping relationship between the DMRS ports/sequences and the index of TFRPs that are partially overlapping. Considering 8 DMRS ports are available based on NR Uu design which corresponds to 3 information bits, then 2 bits of DMRS port information can be used to indicate the TFRP pattern. If flexible starting location of repetition is supported, we can use the remaining bit to indicate whether the current transmission is an initial transmission or a retransmission.

In summary, a typical signalling for mode 2 TFRP operation may include the following: (1) Indication from (pre-)configuration as part of RP (pre)-configuration including Periodicity, Offset (starting slot), Number of repetitions, T/F allocation or TFRP pool. In some examples, the TFRP pool can also be derived based on pre-configured parameters in the RP (e.g. periodicity, offset, etc.) according to some predetermined rule (i.e. outside of RP configuration). Information carried by DMRS port/sequence may include Up to 2 bits for TFRP pattern indication (zero bits are needed in case of orthogonal TFRPs), 1 bit for retransmission or initial transmission (zero bits are needed in case of fixed TFRP starting position), 2 bits for MCS indication, 3 bits for QoS if QoS is indicated in the physical layer and not carried by SCI.

With respect to the initialization procedure, each UE (e.g., UEs in the group 520 shown in FIG. 5) may use a default or configured initial transmission parameter set or use the configured initial transmission parameter set in the configuration procedure to select resources for an initial transmission. In some examples, if some UEs have not been configured with initial transmission parameter set(s), those UEs may randomly select resources (e.g., a specific transmission pattern) from the RP.

Resource Indication Procedure: Regarding the resource indication procedure, each UE uses the default or preconfigured initial transmission parameter set in the initialization procedure to transmit an indication signal in a SL channel, such as a physical sidelink control channel (PSCCH), or a physical sidelink shared channel (PSSCH), to indicate reserved transmission resources to other UEs. In example embodiments, each reserved transmission resource is associated with a priority indicator that indicates a priority value of the reservation (e.g. as noted above, the priority value depends on the type of transmission that the reservation is being made in respect of). In this regard, in example embodiments the indication signal sent by a UE includes a resource indication that identifies the transmission resources the UE is reserving, as well as a priority indicator for the resource reservation. UE's that detect and receive the indication signal can determine, based on the information included in the reservation indication and priority identifier, what transmission resources to exclude from a pool of candidate resources in order to mitigate against collisions.

In some examples, the indication signal may additionally indicate current resource in use, general time-frequency resource for transmission, and one or more of periodicity numbers. In some examples, the reserved transmission resources may include transmission resources for future transmissions and/or retransmission.

Prior to describing the sensing procedure, resource selection procedure, and transmission procedures, a description of Types of resource reservation and the assignment of priority levels to those resource reservation types will now be provided in greater details according to example embodiments. As noted above, examples of five different resource reservation types include: (i) resource reservation for blind retransmission; (ii) long term resource reservation for future transmission of different TB(s); (iii) resource reservation for feedback-based retransmission; (iv) resource reservation for future transmission of an explicitly specified number of TBs; and (v) resource reservation for an initial transmission of a TB using a standalone advance control signal preceding initial transmission of the TB. NR V2X mode 2 supports at least the first three types of resource reservations, namely: (i) resource reservation for bind retransmission of a TB; (ii) resource reservation for future TBs, and (iii) resource reservation for feedback-based retransmission, as discussed further below. In an example embodiment, unique priority indicators or coefficient for adjusting priority of the data packet are set/preconfigured to correspond to the different reservation types.

As noted above, in example embodiments, the priority indicator for a resource reservation is included in an indication signal that is sent in respect of the resource reservation. In various example embodiments the indication signal may be incorporated into one or more of SCI sent in the PSCCH, or a DMRS or preamble sent in the PSSCH. In some examples, the indication signal may be an advanced indication signal that precedes a data transmission.

The reservation types will now be described in greater detail.

Priority P1: Reservation type (i) resource reservation for blind retransmission. Type (i) reservation is a reservation of a sidelink resource for a retransmission of a TB via signaling associated with a prior transmission (e.g., an initial transmission) of that TB. A blind retransmission, also referred to as repetition, is a retransmission of a TB that is not triggered by HARQ feedback or scheduling grant. After an initial transmission, a TB is retransmitted without waiting for a feedback of the initial transmission and without receiving a new scheduling grant for a retransmission. In some examples, reservation of resources for one or more blind retransmission(s) can be indicated in the indication signal sent as SCI associated with the initial TB transmission. In some other examples, reservation of transmission resources for the blind retransmission may be an indication implied in a DMRS sent with the initial TB transmission. The indication may be implicit. For example, the DMRS information (e.g. DMRS port or DMRS sequence) may have a mapping relationship with TFRP or the location of time frequency resource of the retransmission, in which case, detecting the DMRS gives the information which TFRP or which time frequency resource for retransmission are used by the transmit UE. The reservation indication for a resource reservation for a blind retransmission typically includes an indication of the time-frequency resources (e.g. indication of a TFRP) that will be used for the blind retransmission.

If the number of retransmissions of a TB is greater than 1, two options for reserving retransmission resources include: option 1, for each transmission (for example including an initial transmission and each retransmission) of a TB, reserve the resources for all of the following transmissions/retransmissions of the TB; and option 2, for each transmission (e.g., initial transmission or retransmission) of a TB, only reserve the resources required for the next/subsequent retransmission of the TB. Option 1 provides earlier notification of subsequent resource requirements but may require more network overhead to indicate the reserved resources. In some example embodiments, a UE may be configured to only perform option 1, and in some example embodiments a UE may be configured to only perform option 2. In some examples, a UE may be configured to select between option 1 or 2 based on one or more criteria. For example, a UE could be configured to determine if the number of TB retransmissions is greater than a threshold, and if so use option 2, otherwise use option 1. In some examples, option selection could be based on sensed channel information. In some examples, the number of blind retransmissions that will be performed may be configured or preconfigured for the UE, and in some examples the UE may be configured or preconfigured to select the number of blind retransmissions up to a predefined number based on criteria such as sensed channel conditions or transmission backlog at the UE.

For illustrative purposes, the priority indicator "P1" is used herein to represent a priority value or a priority level that is associated with the reservation type (i) or dependent on reservation type. The priority indicator P1 may also depends on the priority of the data packet. Similarly, priority indicator P2, P3, P4, P5 represent a priority value or a priority level that is associated with the reservation type (i), (ii), (iii), (iv) or is dependent on the reservation type. The priority indicator P1 may also depends on the priority of the data packet. However, in at least some examples, different priority levels could be associated with each of the different options included in the above paragraph. In some examples, the priority indicator "P1" may be obtain through an equation, a value, or any other types of parameters to define the priority value or the priority level.

Priority P2: Reservation type (ii): long term resource reservation for future transmission of a different TB. Type (ii) reservation is a reservation of a sidelink resource for a transmission of a TB via signaling associated with a prior transmission of a different TB. Resource reservation for future transmission of a different TB refers to a reservation that is specified in the indication signal sent in association with a first data transmission (e.g. a first TB) to reserve transmission resources for a future, different data transmission (e.g., a second TB that is not a repetition of the first TB). Thus, resources reservation of a future TB means that each UE may use the indication signal sent in association with a first TB to reserve resources for transmission of a future, second TB that is different than the first TB. For example, the indication signal transmitted in an SCI associated with a first TB (e.g. TB1) can include a resource reservation for a transmission of a further, second TB (e.g., TB2). In different examples, the resource reservation for TB2 may be included only in an indication signal associated with the initial transmission of TB1; in some examples, the resource reservation for the future, TB2 may included in the indication signal associated with both an initial transmission of TB1 and any retransmissions of TB1. In various examples, the resource reservation for TB2 could include reservations for transmission resources for: (i) only the initial transmission of TB2; (ii) the initial transmission and any or a specified number of retransmissions of TB2; or (iii) only a specified number of retransmissions of TB2. In example embodiments, some or all of the above examples may be available as configurable options. Long term here refers to a scenario where a UE reserves future transmission resources in a periodic way, but does not specify a fixed number of TBs to be reserved. The periodicity or resource reservation period (RSVP) can be indicated in the reservation signal or is a predefined value or configured/preconfigured values in the RP configuration (e.g. the reservation period is the same period of TFRP pool describe by FIG. 1 and FIG. 3). The long term here to differentiate this type with type (iv) that is described later, which reserves a specific number of future TBs. For example, when a UE transmits its sidelink transmission using a specific resource located at t0, which may explicitly or implicitly indicate that the transmitting UE will use $t_0+n \times RSVP$ ($n>=1$ and n is an integer) at the same frequency location to transmit the future TBs. Note that with the long term reservation, UE may change the resource in the future if a resource reselection is triggered, or not use the reserved resource if UE does not have packet to transmit at that time.

For illustrative purposes, the priority indicator "P2" is used herein to represent a priority value or a priority level that is associated with or dependent on the reservation type (ii) resource reservation for future transmission of a different TB. However, in some example embodiments different priority values could be assigned to the different examples and options described in the above paragraph. In some examples, NR V2X supports an initial transmission of a TB without reservation, based on sensing and resource selection procedure. In some examples, priority indicator P2 corresponds to NR V2X specified functionality that supports reservation of a SL resource for an initial transmission of a TB at least by an SCI associated with a different TB, based on sensing and resource selection procedure. This functionality can be enabled/disabled by configuration or pre-configuration. In some examples, the priority indicator "P2" may be an equation, a value, or any other types of parameters to define the priority value or the priority level.

Priority P3: Reservation type (iii) resource reservation for feedback-based retransmission. The third reservation type, reservation of feedback-based retransmission, is similar to reservation for blind retransmission but allows a UE to consider feedback about the success of earlier data transmissions) (e.g., Hybrid automatic repeat request (HARQ) feedback. In reservation type (iii), the indication signal sent by a UE with an initial data transmission (e.g. TB1) or one of the retransmission of the TB will include a reservation indication for a potential N retransmissions of that data transmission after that transmission. However, upon receiving feedback indicating that prior transmission or retransmission has been successful (e.g. upon receiving an ACK indicating successful decoding), the UE may release the previously reserved future transmission resources and not perform the retransmission on that reserved transmission resource. UE may or may not send out further indication/notification to release these reserved retransmission resources. For illustrative purposes, the priority indicator "P3" is used herein to represent a priority value or a priority level that is associated with or dependent on the reservation type (iii) resource reservation for feedback-based retransmission. In some examples, the priority indicator "P3" may be an equation, a value, or any other types of parameters to define the priority value or the priority level.

Priority P4: reservation type (iv) resource reservation for future transmission of an explicitly specified number of TBs. In reservation type (iv), a transmitting UE may explicitly reserve resources for a fixed number of future TBs to be transmitted using the same periodic resources. For example, the reservation indicator included in an SCI associated with an initial data transmission (e.g. initial TB1 transmission) specifies a time/frequency resource (e.g $t_0$, $f_t$) for the TB1 transmission within a RP; the reservation indicator also indicates that the same resource will be required for a resource reservation period (RSVP) for each of a specified fixed number (m) of TBs. Thus, the transmitting UE will use $t_0+n \times RSVP$ ($1<=n<=m$) to transmit the m future TBs. As the transmitting UE knows the number of future TBs to be transmitted, the UE can reserve resources with the initial TB request for the m TBs without performing any resource reselection until after transmission of the m TBs is finished. In some embodiment, if the transmission pattern pool or TFRP pool is defined periodically with a periodicity, then RSVP can be equal to periodicity. The difference between type (iv) and type (ii) is that UE is most likely use the resource it reserves in type (iv) as UE may know that it has packets to transmit for this type of reservation and UE will not perform reselection of resources before the m reserved TBs are transmitted.

For illustrative purposes, the priority indicator "P4" is used herein to represent a priority value or a priority level that is associated with the reservation type (iv) resource reservation for future transmission of an explicitly specified number of TBs. In some examples, the priority indicator "P4" may an equation, a value, or any other types of parameters to define the priority value or the priority level.

Priority P5: (v) resource reservation for an initial transmission of a TB using a standalone advance control signal preceding initial transmission of the TB. A fifth reservation type reserves resources for initial transmission of a TB using a standalone SCI. When a transmitting UE reserves an initial transmission of a TB, the reservation signal can be sent in advance without an associated data (or PSSCH) transmission. The reservation signal can be send in a SCI or a dedicated reservation signal. The reservation of the initial transmission of the TB may be indicated and sent within in a separate indication signal (e.g., SCI) in a control channel in advance. For illustrative purposes, the priority indicator "P5" is used herein to represent a priority value or a priority level that is associated with the reservation type (v) resource reservation for an initial transmission of a TB using a standalone advance control signal preceding initial transmission of the TB. In some examples, the priority indicator "P5" may be an equation, a value, or any other types of parameters to define the priority value or the priority level.

It is noted that, in following discussion, for ease of illustration, "P1" represents a priority value or priority level corresponding to the reservation type (i) to describe how the priority value of "P1" will be calculated or determined based on sensed reservation type. Likewise, "P2", "P3", "P4", "P5" will also represent a different priority value or different priority level to correspond to the reservation type (ii), (iii), (iv), (v) further to describe how the priority values of "P2" "P3" "P4" "P5" will be calculated or determined based on different sensed reservation types.

In some examples, the priority values associated with different reservation types that are used for resource selection of sensing UE may be derived or determined by an equation, for example: $Pi=ai \times Pd$ or $Pi=ai \times delta\_pd$, where $i=1, 2, 3, 4$, or $5$, where ai is a priority coefficient associated with reservation type i and Pd indicates a relative priority of the current or future data transmission of the UE that performs the reservation (e.g. a priority of the packet being transmitted using the TB). In some examples, the UE that performs the reservation is referred to as the "reservation UE" and the UE that performs sensing and resource selection is referred to as the "sensing UE". In some examples, a sensing UE will become a reservation UE after it has acquired (by sensing signals sent by other reservation UEs) the information required to make reservations for its own transmissions. The priority coefficient can be predefined, configured, or preconfigured, or derived, or determined based on other parameters/factors. In some examples, a priority coefficient may be determined by a sensing UE based on a reservation type indicated in a sensed indication signal. For example, priority coefficient a1 may be determined by recognized reservation type (i) and may be used to correspond to the recognized reservation type (i). Similarly, a2, a3, a4, and a5 may be determined using the similar approach to the counterpart a1. Priority level Pd can be a priority value or level that is associated with the priority of data packet/traffic the reservation UE is transmitting currently, or the priority of data packet/traffic it will transmit in the reserved resource for future transmission. In some embodiment, the priority level Pd is associated with some priority related property in the logical channel of the data. Accordingly, in some examples, priority level Pd may represent a different priority (e.g., data packet priority) that is different then the priority value associated with a resource reservation type. $Delta\_Pd=Pd-Pself$ is a priority difference between priority value of reserved data transmission (Pd) and the priority value of data to be transmitted by the sensing UE (Pself) that is performing and sensing and resource selection. The priority level Pd can be explicitly or implicitly indicated in the reservation signal or signal that is associated with the data transmission. For example, priority level Pd of the data can be indicated in the sidelink control channel (e.g., as SCI) that is associated with the SL data (PSSCH) transmission or priority level Pd can be implicitly indicated using DMRS information (such as DMRS port/sequence information) and its mapping relationship to the priority level. Thus, in such examples, the priority value applied by a sensing UE to a resource reservation by a reservation UE can be based on both the resource reservation type (with priority coefficients ai used to assign different priority levels to different resource reservation types) and a priority Pd of the data that the reservation is being made in respect of.

With reference to the priority indicators P1 to P5 identified above, a possible priority configuration for resource reservation types (i) to (v) is as follows. Resource reservation type (ii) is usually used to guarantee a long term reservation, and accordingly the priority level P1 associated with reservation type (i) may be set to be greater than that for value of P2, such as P1>P2. This is because for type (ii) reservation, the reservation UE that reserves the resources (or TFRP) may not actually use the same resource during the resource selection window of the sensing UE simply because the reservation UE may not have a packet to transmit or it performed a (re)selection. On the other hand, for type (i) reservation, the reservation UE which reserves the resources for blind retransmission is highly likely to use the retransmission resource which may impact the sensing UE. In some examples, P1 and P2 may be determined by respective functions: P1=a1×Pd and P2=a2×Pd, where a1 and a2 are configured or preconfigured or predefined coefficients, and a1>a2 (this is assume a higher value of P1 or P2 represents higher priority). In some embodiments, a1=1 or simply P1=Pd and a2, which is associated with reservation type (ii), is a predefined, configured or derived coefficient chosen between 0 and 1. The coefficient a1, a2 may be determined by respective reservation types (i), (ii) respectively, which may be predefined or configured. In one example, a1=1, a2=0.5. In another example, a1=1, a2=0.3. The coefficients a1, a2 may also be indicated by two different indication signals or one indication signal. In some examples, P1 and P2 may be determined by respective functions: P1=a1×delta_Pd and P2=a2×delta_Pd, where a1 and a2 are configured or preconfigured or predefined coefficients, and a1>a2 (this assumes a higher value of P1 or P2 represents higher priority).

In some examples, a sensing UE may also take the priority of the data the sensing UE will be transmitting into account as well as the priority of the data that a further UE (e.g., the reservation UE) has reserved a resource in respect of—for example a sensing UE may determine delta_Pd represented by an equation: delta_Pd=Pd-Pself, where delta_Pd represents a priority difference, Pd represents packet priority sensed for reservation sent from a reserving UE, and Pself represents packet priority for the packet that the sensing UE itself will transmit. In another example, instead of multiplying the data priority with a coefficient to obtain the priority associated with the reservation type, the sensing UE may reduce the priority of type (ii) with respect to type (i) by adding or subtracting the priority with a constant that is associated with the reservation type, e.g, P1=Pd−C1, P2=Pd−C2; where C1 and C2 are constants associated with the reservation type and C1<C2, e.g. C1=0, C2=1; The same methodology applies to other reservation types.

In some examples, the priority level associated with priority indicator P4 is set or determined or calculated to be greater than that of P2. An example is P4=Pd or a4×Pd, P2=a2×P4 or P2=a2×Pd, where a2 and a4 are priority coefficients that is associated with type (ii) and type (iv) reservation, e.g., a2 is between 0 and 1 and a4=1 or a2 and a4 are other values satisfy a2<a1. This is because the UE reserved resource for a specific number of TBs for type (iv) reservation is very likely to use resources for transmission of future TBs, while for type (ii) reservation, the reservation is based on the assumption that a reservation UE will use the same (periodic) resource without reselection. If the UE does reselection before transmitting on the reserved resource or does not have a packet to transmit at the reserved resource, the reserved resource may not be used for type (ii). In some examples, the priority level P4 associated with priority indicator is set or determined or calculated to be equal to P3 as for both cases, the reservation UE is most likely to use the resource it reserves.

In some examples, as a resource for the fifth reservation type (v) has a high probability of being used by a transmitting UE than type (ii) reservation, when the sensing UE detects that a received indication signal indicates resource reservation of reservation type (v), the priority level associated with P5 may be set or determined or calculated by the sensing UE to be equal to P1 and to be greater than P2, which is denoted by a equation: P5=P1>P2. In some examples, the priority level of P5 may be set or determined or calculated to be equal to the priority level P4.

In the above embodiment, the sensing UE needs to know the reservation type of the reservation UE in order to adjust the packet priority to take into account the reservation type and use it for resource selection. The reservation type can be explicitly indicated in the reservation signal, or explicitly obtained from some property of the reservation or a combination of the two.

In another embodiment, the method to assign different priorities to different reservation types may be achieved by directly incorporating the different priority levels associated with different reservation types in the reservation signal. In this case, when a transmitting/reservation UE obtains the packet priority Pd from the priority information associated with the data transmission, the transmitting/reservation UE may directly apply different respective predefined or preconfigured or configured coefficients (e.g., a1, a2, a3, a4, and a5) to obtain or calculate P1, P2, P3, P4, P5 etc. and indicate that the priority level has already taken into account the reservation type in the reservation signal instead of Pd. In this case, the sensing UE does not need to take into account the reservation type when processing the priority information from the reservation signal to be used for resource selection. E.g., for reservation type (i), a transmitting UE indicates P1=a1*Pd in the priority indication of the reservation signal, while for reservation type (ii), a transmitting UE may indicate P2=a2×Pd, where a1 and a2 are the priority coefficient associated with type (i) and type (ii) reservation, respectively, e.g., a2 is between 0 and 1, a1=1. In this case, the sensing UE obtains the priority information that has already taken into account the reservation type and it does not need to differentiate the reservation type to use the priority value for resource selection.

In some examples, the priority levels may be dynamically determined based on sensed information (e.g., sensed reservation type) by each sensing UE when the sensing UE performs the sensing procedure, which will be described in detail in the sensing procedure.

In some examples, different reservation types may have different impacts on the resource selection procedure. For example, for the reservation type (i) the reservation UE which reserves the resources for blind retransmission is highly likely to use the retransmission resource which may impact the sensing UE; on the other hand, for reservation type (ii), a reservation UE that reserves the resources (i.e. TFRP) may not actually use the same resource during the resource selection window of the sensing UE simply because it may not have a packet to transmit or it performed a (re)selection; for reservation type (iii), the reservation UE which makes the reservation for HARQ-feedback based retransmission may release the retransmission resource due to receiving an ACK before the retransmission. Therefore, in general, reservation type (i) reservation should be accounted for by a sensing UE with higher priority compared to reservation type (ii) and type (iii).

In another embodiment, with respect to reservation type (iii) resource reservation for feedback-based retransmission, for unicast, a receiving UE (Rx UE) can just adjust its behavior on whether or not to expect a retransmission based on the HARQ feedback it transmits. For a sensing UE (other UE), their resource selection scheme should lower the priority of a reservation if the reserved resource can be released. This can be achieved by adjusting the priority level by multiplying it with a coefficient less than one if there is a chance the reserved resource may be released based on HARQ feedback. In such case, a sensing UE should adjust the priority associated with reservation of HARQ-feedback based retransmission to be lower than the reservation of blind retransmission for the purpose of resource (re)selection.

Sensing procedure, resource selection procedure, and transmission procedure will now be described in greater detail. The sensing procedure, resource selection procedure, and transmission procedure performed by a UE autonomously jointly shrink available candidate resources and thus significantly decreases the collision probability by limiting every UE to select resources from a narrowed-down candidate resource set (e.g. from a pool of TFRPs) and excludes resources that have been reserved by other UEs. The sensing procedure, resource selection procedure, and transmission procedure performed by the UE autonomously reduce the probability that multiple UEs will select a common resource.

Before the resource selection procedure (e.g., TFRP selection), UE may perform sensing based on DMRS blind detection. The DMRS detection provides the information on the TFRPs used by other UEs during a sensing window. The sensed TFRP based on DMRS blind detection may provide two types of information that will be used for TFRP selection. Firstly, the retransmission resource of the same TB, which is basically a reservation of retransmission resource via implicit DMRS indication; and secondly, the currently in use TFRP by the UE. The latter information is useful in case UE keeps the same TFRP for future transmissions or retransmissions.

During the sensing procedure, each UE listens to communication channel(s) (e.g., PSCCH/PSSCH) to detect received signals (including for example SCI sent on PSCCH and DMRS sent on PSSCH) from its neighboring UEs; this sensing record is then utilized to reduce the size of a set or pool of candidate resources that is to be chosen by the sensing UE for transmission. During the selection process, the UE selects radio resources from the reduced size set of candidate resources. During the transmission process, the UE assigns the selected physical resources to data and control information.

In example embodiments, the reservation/selection and transmission processes are performed by the UE autonomously and configured to stochastically decouple UEs by adding randomness to the resource selection process. However, in example embodiments, the sensing process takes into account predefined priorities of different reservation types, and the selection process selects resources based on the predefined priorities, in order to avoid potential collisions and improve reliability.

Sensing Procedure: Regarding the sensing procedure, during a sensing window, a UE (e.g., a sensing UE) monitors indication signals and other signals in one or more communication channel(s) (e.g., SCI in PSCCH or DMRS in PSSCH) to determine what channel resources are being used and being reserved by other UEs. As noted above, in example embodiments the indication signals include a reservation indication indicating what resources are being reserved (e.g., reservation type) and priority indications for respective resource reservations.

In the case where an indication signal is incorporated into SCI, a sensing UE receives and decodes the SCI to obtain information including resource indications and priority indications.

In some examples, DMRS can be used as implicit indication signals. In some examples, DMRS reception can be blindly performed by a sensing UE, and in some examples a sensing UE may be configured or preconfigured with information about DMRS configurations. In the case where a sensing UE has detected a DMRS blindly in PSSCH, the sensing UE may measure SL reference signal received power (RSRP) of the DMRS.

In some examples, each UE is configured or preconfigured with a transmission pattern pool (e.g. TFRP pool), a DMRS pool, and priority pool, along with mapping information that maps each DMRS from the DMRS pool to a transmission pattern from the transmission pattern pool and a respective priority level from the priority pool. In some examples, multiple different DMRS may map to the same transmission pattern or priority level. In this regard, the DMRS functions as a indication signal that includes a reservation indicator (each DMRS maps to a transmission pattern) and a priority indicator (each DMRS maps to a c priority level). In some examples, the association/mapping configuration may be updated at UEs through signaling (e.g. through RRC signaling, system information or configured or preconfigured to the UE.

By using the mapping, if the sensing UE detects a DMRS, the sensing UE can then derive which resources or patterns other UEs are using and which resources or patterns other UEs have reserved, as well as the priority levels associated with those resource reservations. The mapping that is used to associate DMRS to specific patterns/priority levels may be based on one or a combination of DMRS sequence, different roots/initialization for the DMRS sequence, different cyclic shift values, DMRS time and frequency locations (e.g. different symbols), different orthogonal cover code used, different antenna ports, different code division multiplexing (CDM) groups, different DMRS patterns, or some other aspect of the DMRS.

Example embodiments of possible DMRS structures include the DMRS used in 3GPP NR uplink described in 3GPP TS 38.211 V15.0.0; UL DMRS used in LTE; and a similar DMRS structure as LTE or NR uplink. DMRS can be generated using a sequence, such as gold sequence (or m-sequence) or Zadoff Chu sequence.

The DMRS parameters may be known by the sensing UE, in which case the sensing UE can detect DMRS without blind detection. In some cases, the exact DMRS parameter may not be known by the sensing UE. In this case, the sensing UE can blindly decode DMRSs to find which DMRSs and which DMRS parameters are used. There is usually a finite choice of DMRS parameters that are known to the sensing UE. An example way to perform DMRS detection is to use different choices of potential DMRS sequences to correlate with the DMRS at the potential location of DMRS and find which one gives the highest correlation by finding the output signal with the highest energy. Known sequence detection methods can be applied to perform DMRS detection in example embodiments.

In some embodiments, the DMRS used to indicate resource reservation and priority is transmitted contemporaneously with a data transmission. For example, a DMRS may be transmitted at the same time or in the same slot as a data transmission. In other embodiments, the DMRS that is used to indicate resource reservation and priority is transmitted in advance to indicate the transmission pattern. An advance indication signal may be transmitted before the signal transmission occurs, so that a sensing UE, also referred to as a monitoring UE, may detect the indication signal and use it to avoid a conflict.

In example embodiments, a DMRS functions as a type of transmission resource indication signal (TRIS) that is used to indicate transmission resources and priority levels for the transmission resources. In some embodiments, the TRIS may be implemented using a reference symbol other than a DMRS. Other specific examples of reference signals that can be used for the TRIS include sounding reference signal (SRS), channel state information (CSI)-RS. In some examples, the TRIS is a preamble. In some embodiments, the TRIS is a synchronization signal. In the above examples, the TRIS has other purposes, such as purposes related to channel measurement, channel estimation or synchronization but here are also used to implicitly indicate the transmission pattern.

In the present disclosure, the assumption is that the TRIS is a DMRS, and various options for using the DMRS are provided. It should be understood that these same options apply to the other signals that might be used for the TRIS, including other reference signals, preambles, and synchronization signals.

Resource Selection Procedure: Regarding resource selection procedure, In some example embodiments the sensing UE selects resources for a subsequent transmission or a retransmission based at least in part on the priority levels associated with resource reservations types indicated by other UEs (as noted above the priority levels can be explicitly included in an SCI indication signal, or implicitly in a DMRS, as the case may be) and the priority level associated with the resource reservation type that is being made by the sensing UE. In some example embodiments, the sensing UE calculates a priority value based on a sensed reservation type in an sensed indication signal and determines whether to exclude resources reserved by the sensed reservation type when the sensing UE performs resource selection based on the priority indicators or the reservation type. For example, if a sensing UE detects that a received indication signal indicating a reservation type (i), the sensing UE may calculate a priority value P1 corresponding to the reservation type (i), which may be represented by the function discussed above: $P1=a1\times Pd$, in order to prioritize avoiding a collision with resources that were reserved in respect of a first reservation type (i) associated with priority indicator P1. Thus, the sensing UE may determine that when selecting resources, whether resources reserved by the reservation type (i) will be considered to be excluded by the sensing UE based on the calculated value P1. If the sensing UE determines to take the resource reservation of the type (i) into consideration, when the sensing UE selects resources, the sensing UE may exclude reserved resources of the resource type (i) and then select other available resources from the RP 100 (e.g., TFRP pool).

In some examples, resource (re)selection procedure may assign different priorities for the different reservation types.

Determination of priorities will now be further discussed according to example embodiments in the example context of three priority levels (for example, in the context of reservation types (i), (ii) and (iii)).

For type (iii) reservation, there may be two different mechanisms with respect to how to deal with reserved HARQ-feedback based retransmission. In one embodiment, UE is able to determine whether the transmit UE will release the retransmission based on reading the HARQ feedback information that is sending by the receiver to transmitter. This may be especially applicable to unicast where HARQ feedback is supported and there is only one receiver UE (other scenario, such as groupcast, is not precluded). For each sensing UE, if the UE can decode signals on physical sidelink feedback channel (PSFCH) and obtain information of the signals, the sensing UE determines whether reserved resources for feedback-based retransmission are being used for the current sensing procedure based on the information obtained from the PSFCH. If the sensing UE determines that resources reserved for retransmission have been released, for example, if the sensing UE reads an ACK for unicast transmission, the sensing UE does not try to avoid using resources for the retransmission at all. Or in another embodiment, UE may simply ignore the reservation information as the sensing UE expects the transmit UE to release the reserved resource.

In some examples, if the sensing UE determines that resources reserved for retransmission have not been released, such as the sensing UE reads a negative (NACK) or does not read anything (e.g., no feedback) on PSFCH, the sensing UE may set the priority level/value of the first reservation type equal to the priority level/value of the second reservation type, such as P3=P1. In that case, when the sensing UE selects resources, the sensing UE excludes the first set of resources of the first reservation type corresponding to P1 and the second set of resources of the second reservation type corresponding to P2 concurrently, and then selects other available resources from the RP 100 (e.g., TFRP pool).

In another method regarding type (iii) reservation, a sensing UE may not be able to read other UE's feedback channel or maybe unable to determine whether a transmitting UE can or will release the retransmission resource. In this case, the sensing UE lowers the priority level of the reservation for resource selection purpose instead. Thus, the priority level of P3 may be set or predefined or determined or calculated to a lowest level or set to be lower than the priority level of P1. In the case where P3 is set to be lower than P1, P3 and P1 may be defined by an equation: $P3=a6\times P1$, $P1=Pd$ where $0<a6<1$ or $P3=a3\times Pd$, $P1=a1\times Pd$ and $a1>a3$. P1 and P3 may be calculated by the sensing UE for resource selection and used for resource selection. The coefficients a1, a3 and a6 are coefficients associated with type (i), type (iii) and type (iii) reservation. The coefficient a6 and a3 may be predefined or (pre)-configured or derived based on potential packet loss probability and/or probability of releasing the reserved resources of the feedback-retransmission. Thus, when the receiving/sensing UE selects resources, if the receiving/sensing UE detects that an indication signal indicates a reservation type (iii), the sensing UE may determine that when selecting resources, whether resources reserved by the reservation type (iii) will be considered to be exclude by the sensing UE based on the calculated value P3. If the sensing UE determines to take the resource reservation of the type (iii) into consideration, when the sensing UE selects resources, the sensing UE may exclude reserved resources of the resource type (iii) and then select other available resources from the RP 100 (e.g., TFRP pool), in order to avoid conflict with resources reserved for type (iii).

In some examples, if the value of P3 is lower than a criteria, the sensing UE may determine not to take the resource reservation of the type (iii) into consideration, when the sensing UE selects resources, therefore, the sensing UE may not exclude reserved resources and select any available resources from the RP 100 (e.g., TFRP pool). Some details of the resource selection procedure using different priority value/level is shown later.

This example discloses that the sensing UE determines the priority values or priority levels based on received/sensed information and recognized reservation type used and indicated by other UEs. In some other examples, the priorities (e.g. priority values or priority levels) may be indicated in a SCI or a DMRS and obtained by the sensing UE once the SCI or DMRS is decoded. In some other examples, only the reservation type may be indicated in a SCI or a DMRS and obtained by the sensing UE once the SCI or DMRS is decoded, and then the sensing UE may determine or calculate a priority value associated with the reservation type.

In some examples, the priority value or the priority level of the data packet (e.g. Pd) may be per-packet QoS model based on both ProSe Per-Packet Priority (PPPP) and ProSe Per-Packet Reliability (PPPR). The value of PPPP can be the priority value/level used to address a number of QoS-related physical layer issues, such as resource reservation and packet conflict. The value of Pd may be obtained from higher layer parameter configured to the UE.

In some examples, in the resource selection procedure, the sensing UE may select both resources for initial transmission and resources for all the retransmissions. For example, the sensing UE may select a TFRP to carry out both the initial transmission and blind retransmissions of a TB.

In some examples, the reservation type (ii) may include a type of reservation for future TBs that is similar to a long-term sensing and semi-persistent transmission scheme in LTE V2X, which is employed for resource reservation. With respect to this type of reservation, given a transmission is performed at time $t_0$, frequency location $f_0$, the sensing UE may assume that the transmitting UE will continue to use resource at $t_0+n \times RSVP$ (n=1, 2, . . . ) at the same frequency location $f_0$. Thus, the sensing UE tries to avoid all those resources if they fall into a selection window.

In this case where the reservation type (ii) is employed, after selection of resources, the sensing UE may keep using same resource periodically until a re-selection is triggered. Such a transmission is also called semi-persistent transmission scheme. When the re-selection is triggered, UE may redo the resource selection procedure and select a different resource. There are many reasons that may trigger a reselection, such as a delay requirement of packets cannot be satisfied. The RSVP may be indicated in the SCI associated with data transmission. The reservation period may also be (pre)-configured or predefined without indicating transmissions.

In the case where a semi-persistent transmission scheme is applied, the reservation resources may not be guaranteed to be used. For example, if a transmitting UE does not have packets to transmit in future or a reselection is triggered where the transmitting UE uses different resources for a subsequent transmission, results sensed by the sensing UE are inaccurate. Therefore, the reservation for the semi-persistent transmission scheme may not be as certain as the reservation for blind retransmission.

Figure 2:
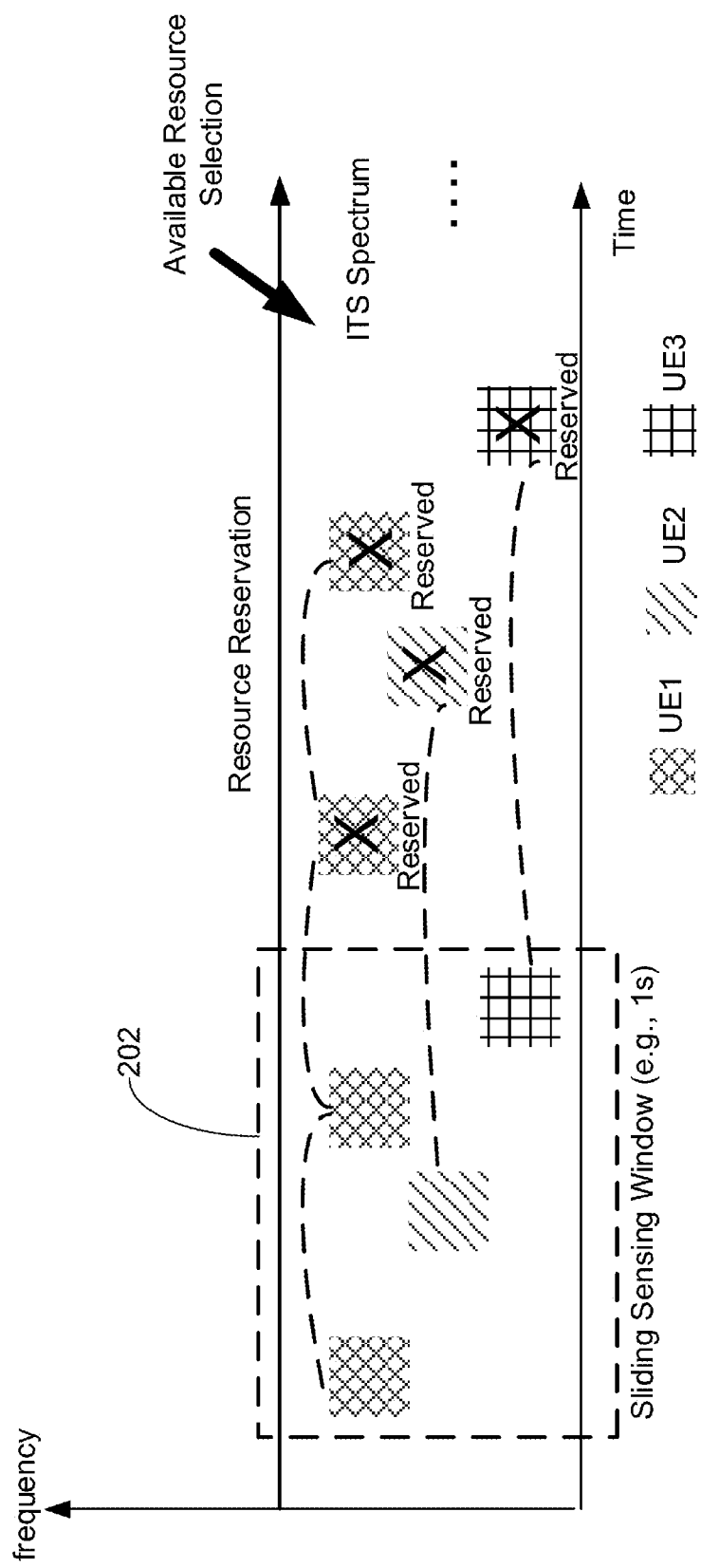
FIG. 2 is a schematic diagram illustrating an example of sensing and resources selection for different UEs.

An example embodiment of SL V2X resource allocation according to the methods described above will now be described. FIG. 2 illustrates an SL communication resource sensing and reservation method in the context of a frequency (y-axis) and time (x-axis) plot. Transmission resources associated with three respective UEs (UE1, UE2 and UE3) are shown as time-frequency blocks within a sliding sensing window 202 and a resource reservation period (e.g., resource selection period). In the example embodiment, vehicle UEs are synchronized, which enables sensing and resource reservation/selection for V2X traffic. SCI decoding, PSSCH DMRS detection and SL measurement can be used for sensing other UE transmissions. Explicit reservation in SCI or implicit indication via PSCCH/PSSCH DMRS by a transmitting (Tx) UE for a receiving (Rx) UE can indicate next TB(s) which can also be used by other UEs for resource selection and exclusion.

In example embodiments, UE1 applies a sliding sensing window 202. The sensing window 202 is defined as a window of length T preceding a packet arrival in which the packet is ready for transmission. The length T of the sensing window 202 can be predefined or configured/preconfigured for the resource pool. In the case a TFRP pool that is explicitly defined with a periodicity, the length of the sensing window can be a multiple of the TFRP periodicity. Within the sliding sensing window 202, UE1 continuously performs one or more of the following sensing actions to collect sensing information: (i) monitors for and decodes the SCIs transmitted from other UEs (e.g. UE2 and UE3 SCIs); (ii) perform DMRS blind detection; (iii) measures PSSCH power or energy corresponding to candidate resources by measuring PSSCH RSRP corresponding to candidate resources. The PSSCH RSRP may be measured using DMRS, e.g., PSSCH RSRP may be defined as the linear average over power distribution of the resource elements that carry DMRS. In some other embodiments, PSSCH RSRP may be measured using other reference signals or data signals. In some examples, power or energy of an alternative signal may be measured. For example, sidelink received signal strength indicator (S-RSSI) can be measured, which is a measurement of PSSCH total energy S-RSSI that may be defined as the linear average of total received power per OFDM symbol observed in the configured sub channel by the UE. For the sensing process, the S-RSSI can be the linear average of samples in a sensing window based on a fixed or configured periodicity.

Figure 3:
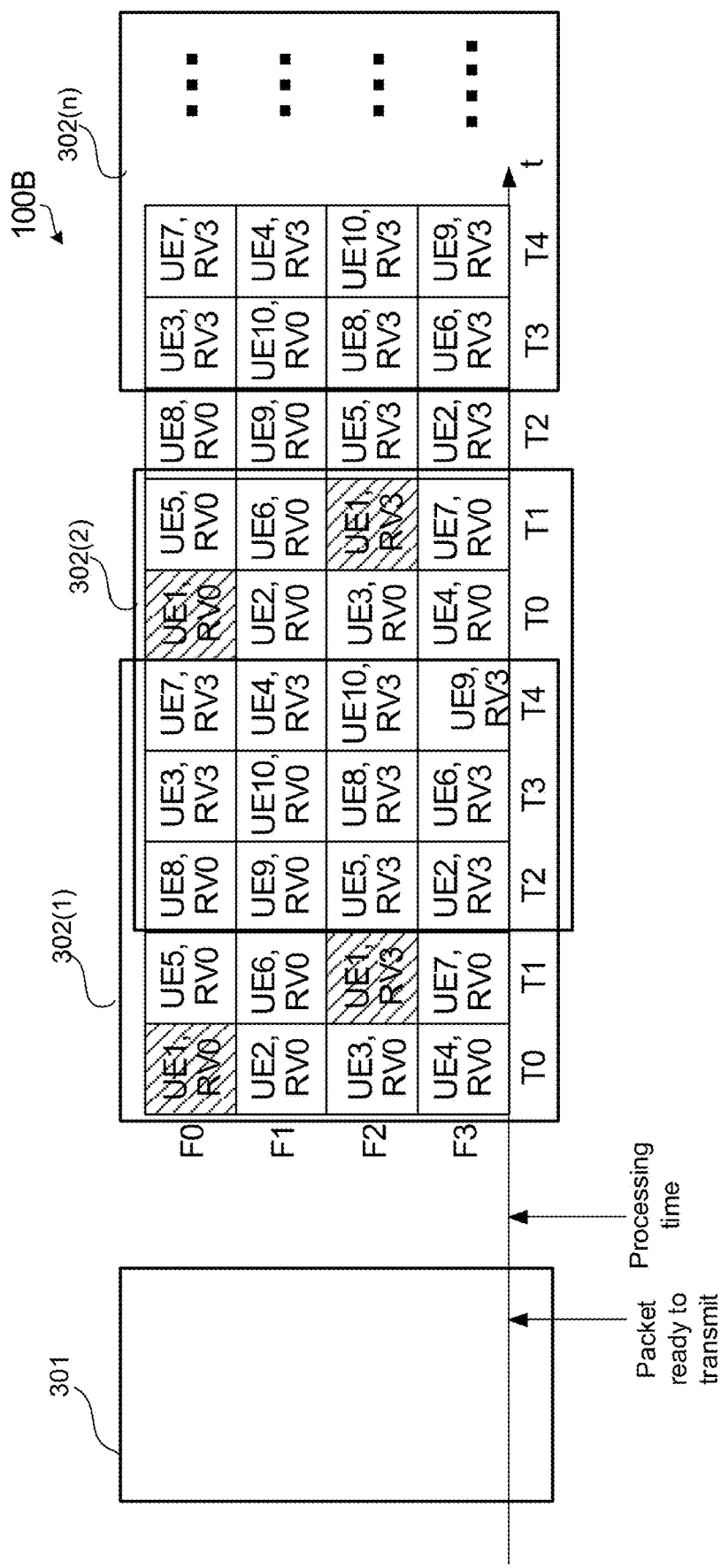
FIG. 3 is a schematic diagram illustrating an example of resource selection using sensing windows.

FIG. 3 shows another example configuration of a TFRP pool 100B. In one embodiment of resource pool (RP) configuration, the time frequency resources that can be used for SL transmission is defined, e.g., the RP configuration may include the boundary and division of frequency sub-channels (e.g., F0, F1, F2, F3 as shown in FIG. 3), the available time slots that can be used for SL transmission. There may be no explicit definition of a transmission pattern pool or TFRP pool, which means a sensing UE may select any combination of resources that are used for initial transmission and retransmission (if needed) for a TB, which forms a transmission pattern or TFRP. In another embodiment, a transmission pattern pool or TFRP pool may be further defined within the resource pool, which limits a certain number of resource combinations that UE can choose for initial transmission and retransmission of a TB, i.e., the sensing UE can choose a specific TFRP among the configured TFRP pool.

As shown in FIG. 3, a sensing window 301 and a set of selection windows 302(1)-(n) (generically referred to as a selection window 302) discussed in the examples are applied in a RP 100B with a periodicity that is greater than 1. As shown in the example of FIG. 3, a sensing UE detects other UE's transmission or performance measurements in the sensing window 301. When the sensing UE's packet arrives, the sensing UE may determine to do a resource selection or reselection within a resource selection window. The resource selection window may be chosen to start at T1 after resource selection or reselection is triggered. T1 may typically be equal or larger than UE's processing time so UE has enough time to do the selection and prepare for the transmission. T1 may be predefined or configured/preconfigured, the configuration may be done within resource pool configuration.

If a transmission pattern pool or TFRP pool is configured/defined as shown in FIGS. 1 and 3, a sensing UE selects a transmission pattern among a transmission pattern pool or selects a TFRP among a TFRP pool. The sensing UE needs to select all the transmission resources for a TB in one-shot, and the sensing UE selects a TFRP within the resource selection window. There are two methods to determine the resource selection window: In a first approach, the starting location of the TFRP window is considered to be fixed. In this case, the resource (re)selection window starts at the first TFRP window that is later than Ts>=0 after the resource (re)selection is triggered. In a second approach, the selection window is set to start at any time slot, i.e., the selection window can start at any time slot Ts>=0 after the resource (re)selection is triggered. The resource selection window length can be equal to the TFRP window length (or the periodicity) or a multiple thereof.

The TFRP pool can be configured in a manner which is discussed in greater detail. In the RP configuration, a periodicity, offset, number of repetitions and the RV sequence corresponding to the repetitions may be configured. The size, granularity, boundaries and division of time/frequency resources may also be configured in the RP. For example, as shown in FIG. 3, F0 to F3 may be configured/defined as one or multiple frequency subchannels, where size and boundary of frequency subchannels are configured for each RP. In time domain, the granularity may be defined as one or multiple slots, e.g., T0, T1, T2, T2, T4 can each represent one slot. The pattern index (UE index as shown in FIGS. 1 and 3) and corresponding location can be predefined or derived from the configured parameters (periodicity, offset, number of repetitions, RV sequence, frequency and time resource division etc.) based on a given rule. FIG. 1 shows an example of such TFRP pool definition, for which it follows the rule that any two patterns does not share the same slot number for both repetitions and all the resources between two patterns does not overlap. In the example of FIG. 1, the periodicity is 5 slots, spans from T0 to T5 and repeat periodically. The offset or starting slot is the time location of T0 or any integer periodicity of duration add or subtract from T0. The pattern repeats itself periodically at the configured/predefined periodicity parameter as shown in FIG. 3.

FIG. 3 illustrates two examples of resource selection corresponding to whether the starting slot of the selection window is flexible. If the starting location of a pattern pool is not flexible, the sensing window can start at beginning of T0 or T0+n*periodicity where n is an integer. In the example of FIG. 3, the resource selection window can be 302(1). If the starting location of pattern pool is not flexible, the sensing window can start at any slot (e.g. T0, T1, T2, T2, T4 or any periodical addition of T0, T1, . . . , T4). The sensing UE then starts to select resources at any start point with a selection window 302. In this example, a start point of a selection window 302 can be varied along the time axis, such as T0, T2, or T3 based on any suitable situation. In this example, the resource selection window can be 302(1), 302(2) . . . , 302(n) etc.

In other examples, the length of the selection window may also be varied based on any suitable configuration. In some embodiment, the length of selection window can be restricted to be equal to the TFRP window length or periodicity or multiple thereof. In some other embodiments, the length of selection window may not have such constraints. The length of selection window may also be determined and bounded by the delay constraint of the data packets/traffic that UE plans to transmit. In some examples, the resource selection may be a TFRP selection. The TFRP selection may be performed at least once within a periodicity of a (pre)-configured grant resources. Configuring a pool of the (pre)-configured TFRPs should enable that any two distinct TFRPs do not collide in at least one time unit, in order to alleviate a half-duplex constraint, which may help to avoid detrimental impacts. Such a method to configure the selection window may help to avoid extra delays for resources selection compared with convention approaches in which a start point of a selection window has been set at a fixed location (e.g., always fixed at T0).

It is noted that, as shown in FIG. 3, to support the flexible starting location of the resource selection window, a sensing UE may be allowed to perform repetition at a flexible starting location. The flexible starting location of repetition means instead of following the time order of transmission/repetition of the same TB as defined in the transmission pattern pool or TFRP pool, the sensing UE can start transmission/repetition of a TB at any transmission resource that belongs to the transmission pattern or TFRP. UE may still perform the same number of repetitions for each TB. For example, with respect to UE5, if the sensing UE selects transmission pattern corresponding to UE5 when the resource selection window corresponding to 302(1) as shown in FIG. 3 is chosen, the sensing UE starts the initial transmission at time frequency resource corresponding to (T1, F0) for the initial transmission for the TB and (T2, F2) for the second repetition or retransmission of the TB within window 302(1). If instead, the sensing UE chooses the transmission pattern corresponding to UE5 when the resource selection window corresponding to 302(2) in FIG. 3 is chosen, the sensing UE then starts the initial transmission for the TB at time frequency location (T2, F2) and performs retransmission/$2^{nd}$ repetition of the TB at time frequency location (T1, F0) within window 302(2). The (T1, F0) in windows 302(2) is one period later than the (T1, F0) in window 302(1). If such flexible starting location of repetition/retransmission is supported, the receiver or sensing UE may need to know 1) whether the current transmission is initial transmission or retransmission or 2) which number (index) of transmission/repetitions among all repetitions the current transmission belongs to, these information can be either indicated in the sidelink control channel (SCI) or indicated using DMRS via any DMRS properties similar to that of previously described to indicate the transmission pattern.

In some examples, UE1 may perform sensing via DMRS blind detection before a packet arrival. The sensing window (e.g., the sensing window 301) is defined as a window of length T preceding the packet arrival. The length of the sensing window can be configured or preconfigured for the resource pool, and can be a multiple of the TFRP periodicity.

In some examples, based on sensing results obtained within the sensing window, UE performs resource selection within a resource selection window. Since a UE needs to select all the transmission resources for a TB in one-shot, the UE should select a TFRP within the resource selection window. There are two methods to determine the resource selection window: In the first approach, the starting location of the TFRP window is considered to be fixed. In this case, the resource (re)selection window starts at the first TFRP window that is later than T1>=0 after the resource (re) selection trigger. In the second approach, the resource selection window is defined to start at any slot, i.e., the selection window starts T1>=0 after the resource (re)selection trigger. The resource selection window length can be equal to the TFRP window length (or the periodicity) or a multiple thereof.

In some examples, once UE determines the resource selection window, it should select a TFRP within the resource selection window such that it tries to avoid TFRPs reserved through type (ii) reservation and TFRPs conflicting with retransmission resources indicated by other UEs using type (i) and type (iii) reservations. With the three reservation types (i), (ii), and (iii), LBT type of short-term sensing is not needed in NR V2X, as it may further increase the energy consumption and complexity of the sensing procedure.

Before the initial transmission of a TB, UE may continue sensing based on DMRS blind detection to further check if the selected TFRP has any conflict with (e.g., type (ii) and type (iii)) retransmission reservations). If a conflict is found, UE will reselect or select a different TFRP within a same (re)selection window.

Figure 4:
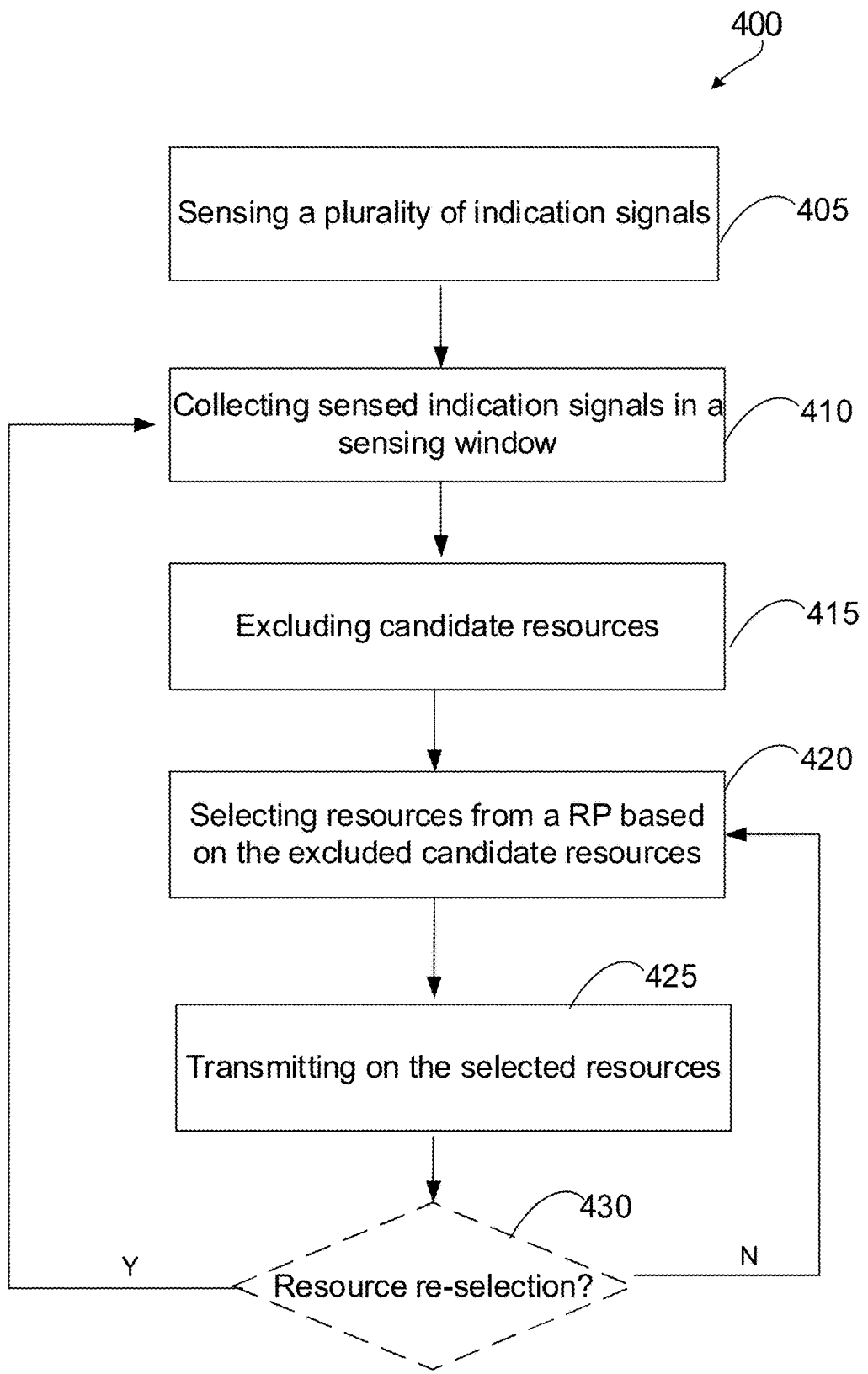
FIG. 4 is a flow diagram illustrating an example of a resource selection method.

FIG. 4 illustrates a method 400 for resource selection according to example embodiments, including a sensing and resource exclusion/resource selection process based on priorities of different reservation types. Such a method may be applied in a sensing and resource selection procedure. The method 400 is described below:

At step 405: A plurality of indication signals are sensed, which may be performed continuously. The indication signals may include other UE's scheduling assignment (SA) or sidelink control information (SCI) or DMRS. Each sensing UE keeps decoding other UE's SA or SCI and/or measures corresponding PSSCH energy and/or measures PSSCH RSRP based on DMRS or measure S-RSSI as described above. The SA may be included in SCI. The PSSCH RSRP may be measured at corresponding PSSCH resource when an SCI or DMRS is detected.

At step 410: The sensed information obtained from the reservation indication signals and SL measurements (e.g PSSCH RSRP or S-RSSI) that are within the sensing window are collected. Thus, even though a UE may continuously sense a large number of indication signals, only information, such as indication signals, sensed within the sensing window will be collected for resource selection. The sensed indication signal may include information regarding PSSCH blind detection, PSSCH DMRS RSRP and SL RSSI measurement.

At step 415: Candidate resources are excluded from a candidate resource set. The exclusion of candidate resources is now discussed in greater details. A sensing UE first determines a resource selection window and forms a set of resources within the resource selection window as a candidate resource set that the sensing UE may select from. If the pattern pool or TFRP pool is configured/defined, the TFRP pool within the resource selection window are the candidate resource set and UE may select a TFRP among the TFRP pool.

After the candidate resource set is formed, UE needs to exclude some candidate resources that may be colliding or have conflict with other UE's potential transmission from the candidate resource set. It is noted that not all potential collisions have the same impact on the UE's resource selection. For example, if a UE's data transmission has high energy when received by the sensing UE, it has much higher impact than a UE's data transmission with lower energy. Therefore, candidate resource exclusion is usually done in two steps: 1) the sensing UE (blindly) decodes SCI or DMRS or any other indication signal at potential locations within a sensing window. 2) If a SCI is decoded or a DMRS or any other indication signal is detected to indicate there are associated data or PSSCH transmissions, the sensing UE further measures the corresponding PSSCH RSRP for that PSSCH resource. PSSCH RSRP represents how much power or energy the sensing UE receives from another UE. If the PSSCH RSRP is larger than a determined threshold (Th), the corresponding reserved resources within the resource selection window or candidate resource set should be excluded, otherwise, if the RSRP is lower than the determined threshold, the corresponding reserved resource is not excluded. In some examples, the determined threshold (Th) that is applied to decide whether to exclude resources reserved for different reservation types may be determined differently. As noted above, the different reservation types correspond to the types of transmissions that the being made in respect of. Accordingly, the determined threshold (Th) for excluding a resource may be adjusted based on the type of transmission that a resource reservation is being made in respect of. For example, for long term reservation using signaling associated with a previous TB (e.g., reservation type (ii)), resource located at time slot $t=t0+n*RSVP$ or $t=t0+n*periodicity$ and with the same frequency location as the detected PSSCH resource that falls in the resource selection window may be excluded, where RSVP is the reservation period and periodicity is the periodicity of the pattern pool or TFRP pool if configured. RSVP can be fixed, predefined, configured or preconfigured in the RP or indicated in the indication/reservation signal (e.g. SCI or DMRS). When a fixed number (e.g., m) of TB is reserved, only a number between 1 to m that falls within the resource selection window may be excluded. In the case of reservation of blind retransmission or HARQ feedback based retransmission of the same TB, only the reserved retransmission resource that falls within the resource selection window will excluded.

Figure 7:
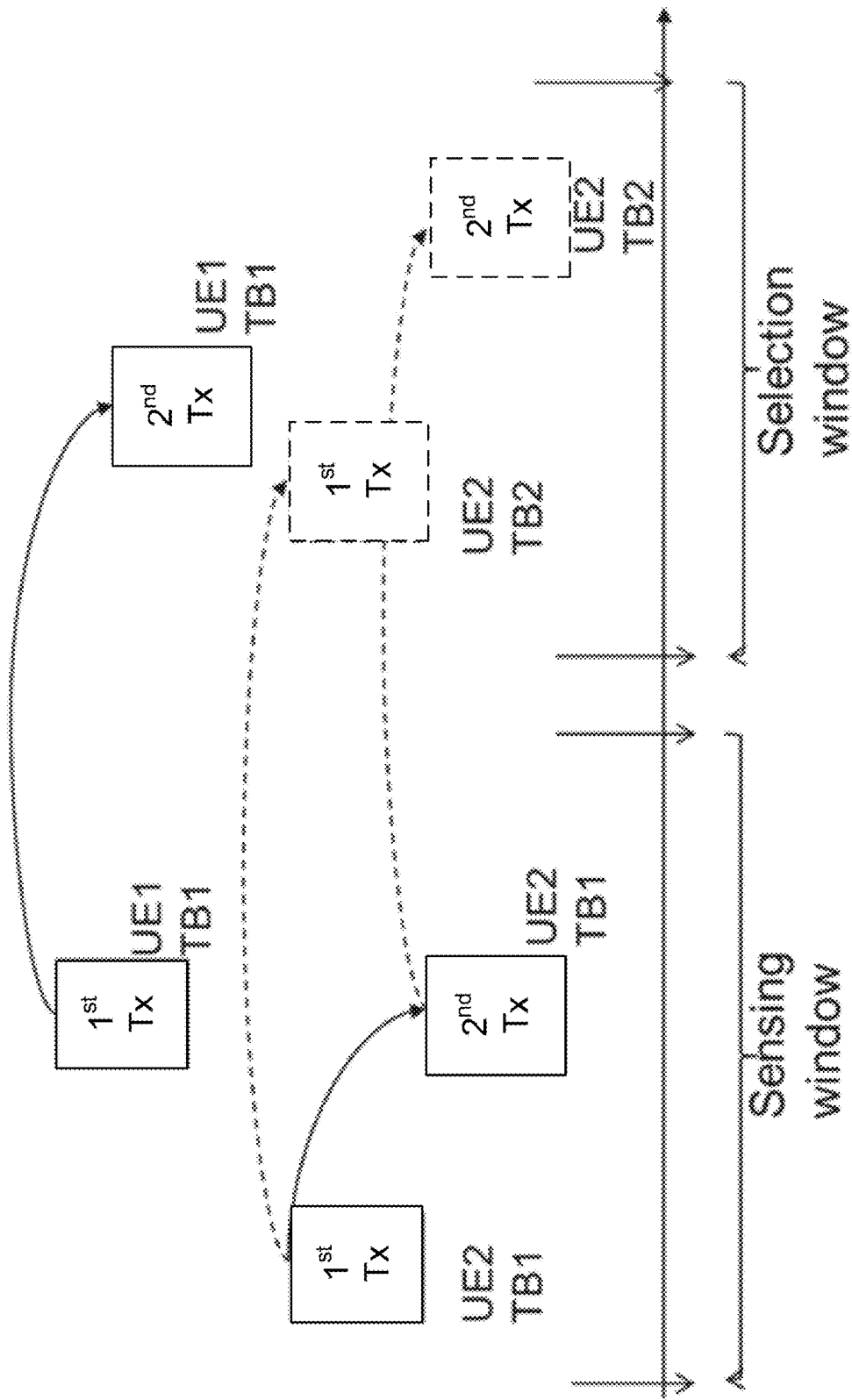
FIG. 7 is a schematic diagram illustrating an example of resource exclusion within a selection window.

FIG. 7 illustrates an example of how to exclude resources within a resource selection window, in particular, for two different types of resource reservations (reservation of a different TB or reservation of retransmission of the same TB). In some scenarios where the remaining resources are less than a percentage of the total available resource in the candidate resource set after exclusion, the sensing UE may increase a determined threshold such that less resources are excluded.

When candidate resource exceeds the determined threshold (e.g. RSRP>Th), and the number of other UEs sensed using that candidate resource is larger than a threshold number (L) of UEs, where L can be 0, 1, 2 . . . , resources are excluded from a candidate resource set. In some embodiment, the number of other UEs L is not taken into account in the resource exclusion, only the RSRP value and threshold is taken into account.

It is noted that the above exclusion approach demonstrates the lower the determined threshold, the more likely the corresponding reserved resource is excluded from the candidate resource set, i.e., the reservation is being considered as a higher priority from the perspective of the sensing UE. Therefore, when resource selection is performed, the priority values or priority levels of P1-P5 described above may be used by using the priority value or level to determine the threshold (Th) of RSRP for resource exclusion.

Table 1 shows an example mapping relationship between priority and threshold. The left column shows different priority level corresponding to the transmitted data of the sensing UE, which is performing sensing and resource selection. The top row of table 1 shows different priority levels corresponding to the other UE that is performing transmission/reservation and indication signals are detected/sensed by the sensing UE. In this example, 4 different priority levels are defined. The number of different priority values defined is usually restricted to a certain number due to signaling overhead; however, this is illustrative, in some other examples, any number of different priority values may be applied. Table 1 shows depending on both a priority level of the sensing UE and a priority level of the reservation UE (e.g., a transmitting UE), thresholds Th1 to Th16 can be used. The threshold values Th1 to Th16 can be predefined or configured. For the sensing UE has identical priority levels, the higher the priority level of the reservation UE, the lower the corresponding threshold may be used. In this example, assuming that level 4 has a priority higher than level 3 and level 3 has a priority high than level 2. Etc...., we may have Th1>Th2>Th3>Th4 for the same level 1 data priority of sensing UE, similarly, Th5>Th6>Th7>Th8 etc.

TABLE 1

| | | Priority of other UE or reservation UE (decoded in SCI orindicated by DMRS, taken into account different reservation type) | | | |
|---|---|---|---|---|---|
| | | Level 1 | Level 2 | Level 3 | Level 4 |
| Priority level of sensing UE | Level 1 | Th1 | Th2 | Th3 | Th4 |
| | Level 2 | Th5 | Th6 | Th7 | Th8 |
| | Level 3 | Th9 | Th10 | Th11 | Th12 |
| | Level 4 | Th13 | Th14 | Th15 | Th16 |

The priority value of the reservation UE may be taken into account based on the different reservation types as described above. This can be implemented in two ways as described before, 1) the reservation UE/transmitting UE indicates the priority level of the corresponding data transmission Pd in the reservation signal (SCI or DMRS) without considering the reservation type, and the sensing UE adjusts the priority value according to the reservation type according to the method described above. For example, for reservation type (ii), the sensing UE may obtain P2=a2*Pd, where a2 may be between 0 and 1, e.g. 0.5, and use P2 for the priority level of the reservation UE and to find the corresponding threshold using table 1. 2) the reservation UE takes into account the reservation type of transmission, obtains a new priority level P1 to P5 depending on the reservation type, and indicates the corresponding priority level that has already been taken into account the reservation type in the reservation signal (SCI or DMRS). The sensing UE uses the priority level obtained from the reservation signal to find the threshold regardless of the reservation type. For example, if the reservation type is type (ii), the priority level associated with the data transmission for the reservation UE is Pd, the reservation UE then calculates P2=a2*Pd where a2 is between 0 and 1 and indicate priority P2 in the reservation signal (SCI or DMRS). Since the number of defined priority levels may be a maximum value, the P1-P5 calculated above may be further quantized or mapped to the total number of priority values before indicating it in a reservation signal or used in table 1 to find the threshold. For example, if a priority value/level is defined with level 1, 2, ... n, instead of using P2=a2*Pd, we may use P2=floor(a2*Pd), P2=ceiling(a2*Pd) or P2=round(a2*Pd) to obtain the priority value P2 that taken into account the reservation type to ensure P2 is ending up to be an integer value and a valid priority level.

Another method to use different priority values for resource exclusion is that the priority values of all the reservation signal or indication signals detected within the sensing window may be ranked in an ascending order. The candidate resources corresponding to the reserved resource may be excluded in the ascending order which corresponds to a ranking of all the priority values of corresponding reservation signal.

At step 420: A candidate resource from the candidate resources remaining in candidate resource set (e.g., RP) is selected based on the excluded candidate resources. In example embodiments, the candidate resource could be randomly selected from the remaining candidates within the RP. In another example, the remaining resource after exclusion may be ranked further based on S-RSSI measurement, and a subset of the resources among the remaining resource is selected. The subset may be a fixed percentage of total resources, e.g., 20%. After the subset of resource selected, UE may randomly select a resource or resources or a TFRP among the subset of selected resources.

At step 425: data (e.g. TBs) is transmitted on the selected resources according to traffic arrival at transmitting (Tx) UE.

Optionally, at step 430: resource re-selection is determined. If it is determined that resource re-selection is needed, restart to the sensing and selection process. If resource re-selection is not needed, data transmission is performed on the same selected resources.

In some examples, re-selecting a resource may be performed at other situation, i.e. perform another resource selection according to the above procedure if any of the following triggers occur: transmission opportunities run out; UE consecutively misses a number of transmission opportunities; and the current resource selection cannot meet the latency requirement.

In example embodiments, as an alternative approach of the sensing procedure based on SCI (for example when no SCI is associated with data or when an SCI and its associated data are transmitted in the same slot), PSSCH-RSRP can be measured based on the DMRS of PSSCH and used to determine a number of other UEs.

Accordingly, a resource can be excluded if either one of the two conditions are met:

Condition 1 (using SCI): the candidate resource is (i) explicitly indicated or reserved by a decoded SCI and (ii) PSSCH-RSRP in the associated PSSCH (data resource) is above a threshold that is determined by priorities P1-P5, when the number of decoded SCIs for which the PSSCH-RSRP in the associated PSSCH (data resource) is above a threshold is larger than L. Condition 2 (No SCI): the candidate resource is implicitly indicated or reserved by a blindly detected PSSCH DMRS, when the number of such blindly detected DMRSs is larger than L.

In some embodiment, L=0, which means as long as one UE reserved transmission, the reservation will be taken into account.

After the resources are selected from the resource selection window or TFRP is selected from the TFRP pool within the resource selection window and before the initial transmission of a TB, the sensing UE will continue sensing based on sensing the reservation signal (DMRS blind detection or SCI detection) to further check if the selected resource or TFRP has any conflict with retransmission reservations (e.g., type (ii) and (iii) reservations. If a conflict is detected, the sensing UE will (re)select a different resource or TFRP from a RP within the same (re)selection window.

Referring again to FIG. 4, a summary of an illustrative embodiment described above is as follows. In step 405 the plurality of sensed indication signals sensed by a sensing UE include a signal transmitted by a reservation UE indicating a resource reservation for a shared channel (e.g., PSSCH) for a sidelink (SL) transmission by the reservation UE and a priority (e.g. Pd) associated with the SL transmission. The sensing UE determines a threshold (e.g. Th1 to Th16) based on a type of the SL transmission (e.g., transmission type corresponding to reservation type (i), (ii), (iii), etc.) and the priority (Pd). In steps 415 and 420, the first UE selects a resource (e.g. a PSSCH resource) in the shared channel to use for a SL transmission by the first UE based on the threshold. In an example of the illustrative embodiment, the threshold (Th) specifies a signal power (e.g. PSSCH RSRP), and collecting the sensed signals includes measuring a signal power in the shared channel in respect of a resource (e.g., a PSSCH resource) indicated in the resource reservation. The resource indicated in the resource reservation is excluded in step 415 if the measured signal power exceeds the threshold.

In an example of the illustrative embodiment, the priority (Pd) indicates a priority level of data for the SL transmission by the second UE, and determining the threshold (Th) includes adjusting the priority (Pd) based on the type of SL transmission that the resource reservation has been indicated in respect of (e.g., P1=a1×Pd; P2=a2×Pd, etc., where a1, a2 are priority coefficients each associated with a respective reservation type for a respective SL transmission type), and selecting the threshold (Th) by mapping the adjusted priority (P1, or P2, etc.) to a respective threshold.

In an example of the illustrative embodiment, a set of candidate resources (e.g. a RP) are predefined for the shared channel (PSSCH), and in step 415 excluding the resource indicated in the resource reservation comprises excluding the resource from the set of candidate resources and in step 420 selecting the resource in the shared channel for the SL transmission by the first UE comprises selecting a resource from candidate resources remaining in the set of candidate resources.

Apparatus Descriptions

Figure 5:
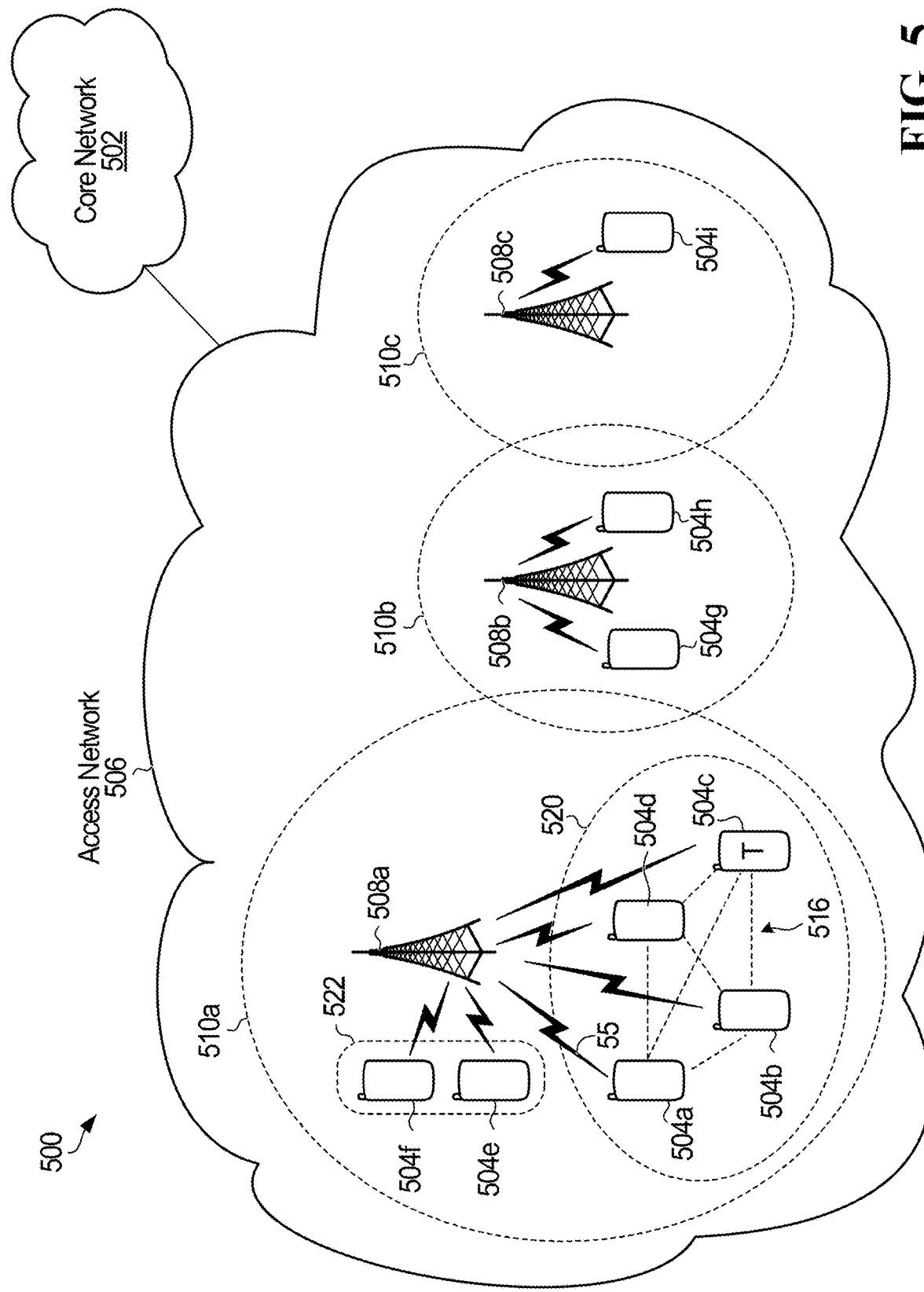
FIG. 5 is a block diagram illustrating an example of a telecommunications network according to one embodiment.

FIG. 5 is a block diagram illustrating an example of a telecommunications network 500 according to one embodiment, for implementing any one or combination of two or more of the above described methods. The telecommunications network 500 includes a core network 502 and an access network 506. The access network 506 serves a plurality of UEs 504a, 504b, 504c, 504d, 504e, 504f, 504g, 504h, and 504i. The access network 506 could be an Evolved Universal Terrestrial Access (E-UTRA) network. As another example, the access network 506 could be a cloud access network (C-RAN). The access network 506 includes a plurality of BSs 508a, 508b, and 508c. The BSs 508a-c each provides a respective wireless coverage area 510a, 510b, and 510c. Each of the BSs 508a-c could be implemented using a radio transceiver, one or more antennas, and associated processing circuitry, such as antenna radio frequency (RF) circuitry, analog-to-digital/digital-to-analog converters, etc.

Although not illustrated, the BSs 508a-c are each connected to the core network 502, either directly or through one or more central processing hubs, such as servers. The BSs 508a-c could serve as a gateway between the wireline and wireless portion of the access network 506.

Each one of BSs 508a-c may instead be referred to as a base transceiver station, a radio BS, a network node, a transmit node, a transmit point, a Node B, an eNode B, or a remote radio head (RRH), depending upon the implementation.

In operation, the plurality of UEs 504a-i access the telecommunications network 500 using the access network 506 by wirelessly communicating with one or more of the BSs 508a-c.

UEs 504a-d are in close proximity to each other. The UEs 504a-d can each wirelessly communicate with the BS 508a. The UEs 504a-d can also directly communicate with each other, as represented at 516. The communications represented at 516 are direct communications between UEs that do not go through an access network component, such as a BS. As shown in FIG. 5, UE to UE communications 516 are directly between the UEs 504a-d and are not routed through the BS 508a, or any other part of the access network 506. Communications 516 may also be referred to as lateral communications. In embodiments disclosed herein, UE to UE communications use a SL channel and a SL air interface. On the other hand, a communication between an access network component, such as BS 508a, and a UE, as in communication 55, is called an access communication. The access communication occurs over an access channel, which can be a UL or DL channel, and the access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or a SL air interface are: Long Term Evolution (LTE), LTE License Assisted Access (LTE-LAA), 5G New Radio, and WiFi.

By using the SL communications 516, the UEs 504a-d may be able to assist with wireless communications between the UEs 504a-d and the BS 508a. As one example, if UE 504c fails to correctly decode a packet received from the BS 508a, but if UE 504d is able to receive and correctly decode the packet from the BS 508a, then UE 504d could directly transmit the decoded packet to UE 504c using SL communications 516. As another example, if UE 504c moves out of wireless coverage area 510c, such that UE 504c can no longer wirelessly communicate with the BS 508a, then UE 504b could forward messages between the UE 504c and the BS 508a. As another example, UE 504a and UE 504c could both receive a signal transmitted from the BS 508a that carries a packet meant for UE 504c. UE 504a may then transmit to UE 504c, via SL communications 516, the signal as received by UE 504a. UE 504c may then use the information received from UE 504a to help decode the packet from the BS 508a. In these examples, capacity and/or coverage may be enhanced through the assistance of UEs 504a, 504b, and/or 504d. V2X communications as referenced herein are an example of SL communications.

The UEs 504a-d form a UE group 520. The access network 506 could assign a group identifier (ID) to the UE group 520. The UE group ID may allow the access network 506 to address the UE group 520 as a whole and distinguish the UE group 520 from other UE groups. The UE group ID may also be used to broadcast information within the UE group, i.e. address all other UEs within the UE group 520. The UE group 520 may form a logical or virtual device mesh in which the members of the UE group 520 communicate amongst themselves using UE communications over an SL air interface. The UE group 520 as a whole can act as a single distributed virtual transceiver with respect to the access network 506. The UE group ID may be a group radio network temporary identifier (G-RNTI), for example.

When a particular UE in the UE group 520 is being assisted or is to be assisted with wireless communication between that UE and the BS 508a, then that particular UE is referred to as the target UE (TUE). In the examples above, UE 504c is being assisted and is therefore a TUE. The other UEs 504a, 504b, and 504d in the group 520 form a cooperation candidate set, which is a set of UEs that may cooperate to help the TUE 504c. The subset of UEs in the cooperation candidate set that actually assist the target UE 504c form a cooperation active set. The cooperation active set may be dynamically selected to assist the target UE 504c. The UEs in the cooperation active set are referred to as cooperating UEs (CUEs). In UE group 520, UEs 504a, 504b, and 504d form the cooperation candidate set. If UEs 504a and 504b actually assist target UE 504c, then UEs 504a and 504b form the cooperation active set and are the CUEs. As UEs 504a-d move around, some may leave the UE group 520 and/or other UEs may join the UE group 520. Therefore, the cooperation candidate set may change over time, e.g., the cooperation candidate set may change semi-statically. The UE group 520 may also be terminated by the network 506, e.g., if the network determines that there is no longer a need or opportunity for the UE group 520 to provide assistance in wireless communication between the BS 908a and members of the UE group 520.

There may be more than one UE group. For example, UEs 504e and 504f in FIG. 5 form another UE group 522.

Figure 6:
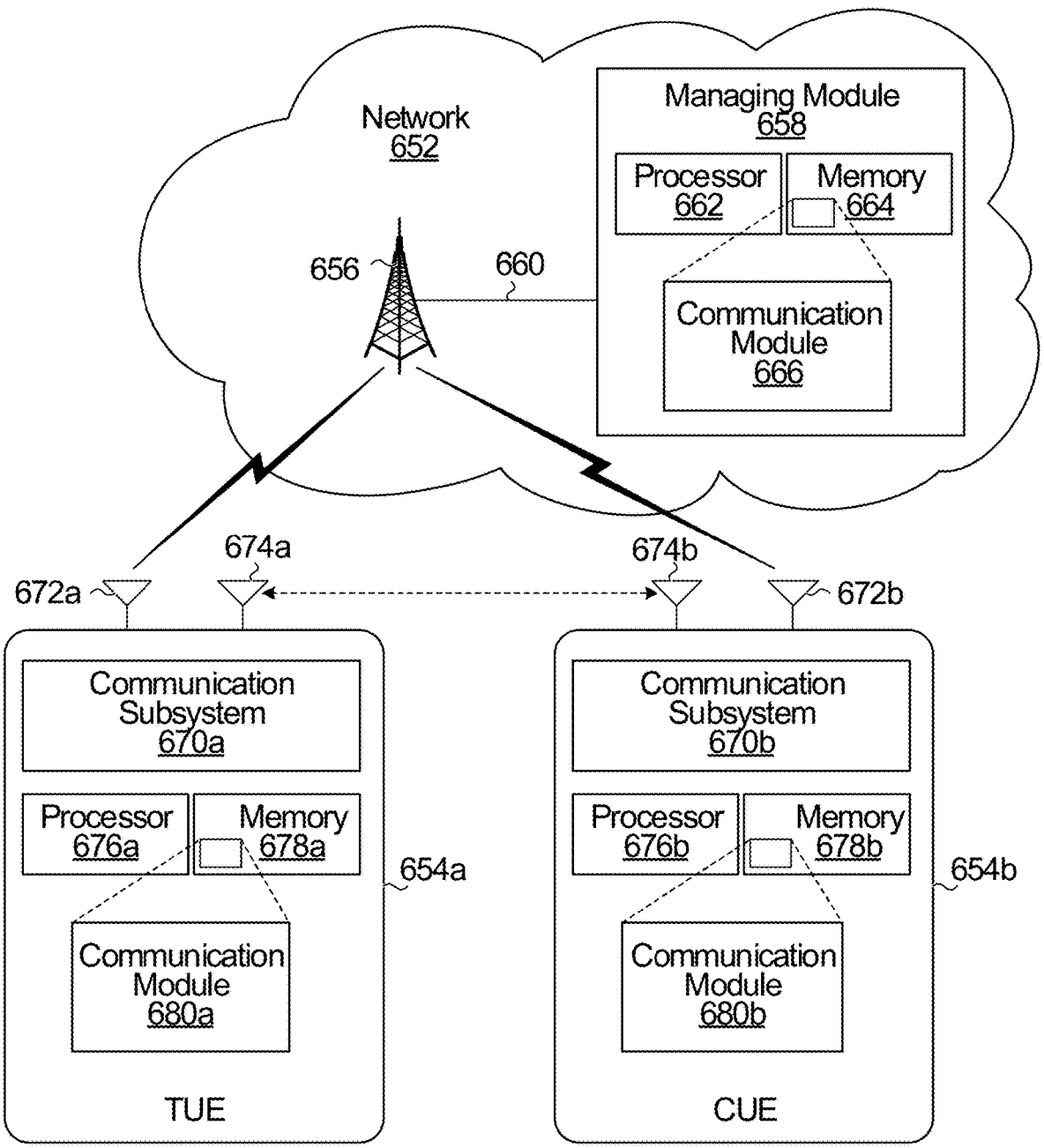
FIG. 6 is a block diagram illustrating an example of a network serving two UEs.

FIG. 6 is a block diagram illustrating an example of a network 652 serving two UEs 654a and 654b, according to one embodiment. The network 652 may be the access network 1406 from FIG. 5, and the two UEs 654a and 654b may be two of the four UEs 1404a-d in FIG. 5. However, more generally this need not be the case, which is why different reference numerals are used in FIG. 6.

The network 652 includes a BS 656 and a managing module 658. The managing module 658 instructs the BS 856 to perform actions. The managing module 858 is illustrated as physically separate from the BS 656 and coupled to the BS 656 via a communication link 660. For example, the managing module 658 may be part of a server in the network 652. Alternatively, the managing module 658 may be part of the BS 656.

The managing module 658 includes a processor 662, a memory 664, and a communication module 666. The communication module 666 is implemented by the processor 662 when the processor 662 accesses and executes a series of instructions stored in the memory 664, the instructions defining the actions of the communication module 666. When the instructions are executed, the communication module 666 causes the BS 656 to perform the actions described herein so that the network 652 can establish, coordinate, instruct, and/or control a UE group. Alternatively, the communication module 666 may be implemented using dedicated circuitry, such as an application specific integrated circuit (ASIC) or a programmed field programmable gate array (FPGA).

The UE 654a includes a communication subsystem 670a, two antennas 672a and 674a, a processor 676a, and a memory 678a. The UE 654a also includes a communication module 680a. The communication module 680a is implemented by the processor 676a when the processor 676a accesses and executes a series of instructions stored in the memory 678a, the instructions defining the actions of the communication module 680a. When the instructions are executed, the communication module 680a causes the UE 654a to perform the actions described herein in relation to establishing and participating in a UE group. Alternatively, the module 680a may be implemented by dedicated circuitry, such as an ASIC or an FPGA.

The communication subsystem 670a includes processing and transmit/receive circuitry for sending messages from and receiving messages at the UE 654a. Although one communication subsystem 670a is illustrated, the communication subsystem 670a may be multiple communication subsystems. Antenna 672a transmits wireless communication signals to, and receives wireless communications signals from, the BS 656. Antenna 674a transmits SL communication signals to, and receives SL communication signals from, other UEs, including UE 654b. In some implementations there may not be two separate antennas 672a and 674a. A single antenna may be used. Alternatively, there may be several antennas, but not separated into antennas dedicated only to SL communication and antennas dedicated only to communicating with the BS 656.

SL communications could be over Wi-Fi, in which case the antenna 674a may be a Wi-Fi antenna. Alternatively, the SL communications could be over Bluetooth™, in which case the antenna 674a may be a Bluetooth™ antenna. SL communications could also or instead be over licensed or unlicensed spectrum.

The UE 654b includes the same components described above with respect to the UE 654a. That is, UE 654b includes communication subsystem 670b, antennas 672b and 674b, processor 676b, memory 678b, and communication module 680b.

The UE 654a is designated as a target UE (TUE) and will therefore be called TUE 654a. The UE 654b is a cooperating UE and will therefore be called CUE 254b. The CUE 654b may be able to assist with wireless communications between the BS 656 and TUE 654a if a UE group were to be established that included TUE 654a and CUE 654b. Other communication scenarios are also contemplated, in a V2X application, for example.

UE 654a may be specifically chosen as the target UE by the network 652. Alternatively, the UE 654a may itself determine that it wants to be a target UE and inform the network 652 by sending a message to the BS 656. Example reasons why UE 654a may choose or be selected by the network 652 to be a target UE include: low wireless channel quality between the UE 654a and the BS 656, many packets to be communicated between the BS 656 and the UE 654a, and/or the presence of a cooperating UE that is a good candidate for helping with communications between the BS 656 and the UE 654a.

UE 654a need not always stay a target UE. For example, UE 654a may lose its status as a target UE once there is no longer a need or desire for assistance with wireless communications between UE 654a and the BS 656. UE 654a may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 654a acts only as a target UE, i.e., TUE 654a, and the UE 654b is a cooperating UE to the TUE 654a, i.e., CUE 654b.

FIGS. 5 and 6 illustrate systems in which embodiments could be implemented. In some embodiments, a UE includes a processor, such as 676a, 676b in FIG. 6, and a non-transitory computer readable storage medium, such as 678a, 678b in FIG. 6, storing programming for execution by the processor. A non-transitory computer readable storage medium could also or instead be provided separately, as a computer program product.

Example embodiments are described that apply generally to any communication system where UEs reserve resources for SL communications based on resource availability.

The present disclosure provides examples in which resources is excluded based on a priority for a reservation type that is indicated in an indication signal, and resources is selected for a subsequent transmission based on determination result regarding whether resources reserved by the reservation type is exclude when selecting resources, which may enable the collision of resources used by different UEs to be reduced significantly. In some applications, the determination result may be obtained by calculating a priority value associated with the reservation type, and determine whether to exclude the resources reserved by the indicated reservation type based on the calculated priority value when performing resource selection. Moreover, as NR V2X supports resource reservations for blind retransmission of a TB, retransmission of future TBs, and feedback-based retransmissions, the method of taking the priorities of the different resources reservations into account provides flexibilities to exclude the resources that have been reserved, which may enable to resources to be selected more efficiently and more accurately.

The present disclosure further illustrates that a start point of a selection window is varied at any time point in a periodic resource pool. Moreover, the length (time duration) of the selection window is also variable.

Although the present disclosure describes methods and processes with action in a certain order, one or more actions of the methods and processes may be omitted or altered as appropriate. One or more actions may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
   sensing, by a first user equipment (UE), a signal from a second UE, the signal indicating a resource reservation for a shared channel for a second sidelink (SL) transmission by the second UE and a priority associated with the second SL transmission;
   determining, by the first UE, a signal power threshold based on a reservation type of the second SL transmission and the priority, the reservation type being one of a plurality of reservation types, each reservation type of the plurality of reservation types corresponding to a different signal power threshold, the plurality of reservation types including at least two of:
   a non-feedback-based SL retransmission,
   a feedback-based SL retransmission,
   an SL retransmission of a first transmission block (TB),
   a new SL transmission of a second TB different from the first TB,
   a long term resource reservation for future transmission of different one or more TBs,
   a resource reservation for future transmission of a fixed number of future TBs, or
   a resource reservation for an initial transmission of a TB using a standalone advanced control signal preceding initial transmission of the TB; and
   selecting, by the first UE, a first resource in the shared channel to use for a first SL transmission by the first UE based on the signal power threshold.

2. The method of claim 1, wherein the method further comprises:
   measuring a signal power in the shared channel in respect of a second resource indicated in the resource reservation, and
   wherein the selecting the first resource to use for the first SL transmission by the first UE comprises:
   excluding the second resource indicated in the resource reservation if the signal power exceeds the signal power threshold.

3. The method of claim 1, wherein the priority indicates a priority level of data for the second SL transmission by the second UE, and wherein the determining the signal power threshold comprises:
   adjusting the priority associated with the second SL transmission by the second UE based on the reservation type of the second SL transmission indicated in the resource reservation to obtain an adjusted priority; and
   selecting the signal power threshold by mapping the adjusted priority to a respective signal power threshold.

4. The method of claim 2, wherein a set of candidate resources are predefined for the shared channel, and wherein the excluding the second resource indicated in the resource reservation comprises:
   excluding the second resource from the set of candidate resources, and wherein the selecting the first resource in the shared channel for the first SL transmission by the first UE comprises:
selecting the first resource from candidate resources remaining in the set of candidate resources.

5. The method of claim 4, wherein the first resource includes a time/frequency resource.

6. The method of claim 1, wherein the signal further indicates a resource reservation type that corresponds to the reservation type of the second SL transmission.

7. The method of claim 1, wherein the shared channel is a shared data channel, and the signal is included in information received over a shared control channel; or
wherein the shared channel is a physical sidelink shared channel (PSSCH), and wherein the signal is a demodulation reference signal (DMRS).

8. The method of claim 1, further comprising:
sending, by the first UE, a first signal indicating a first resource reservation for the first SL transmission by the first UE.

9. A first user equipment (UE) comprising:
a non-transitory memory storage comprising instructions;
a communication subsystem;
one or more processors in communication with the non-transitory memory storage and communication subsystem, wherein the one or more processors execute the instructions to cause the first UE to perform:
sensing, using the communication subsystem, a signal from a second UE, the signal indicating a resource reservation for a shared channel for a second sidelink (SL) transmission by the second UE and a priority associated with the second SL transmission;
determining a signal power threshold based on a reservation type of the second SL transmission and the priority, the reservation type being one of a plurality of reservation types, each reservation type of the plurality of reservation types corresponding to a different signal power threshold, the plurality of reservation types including at least two of:
a non-feedback-based SL retransmission,
a feedback-based SL retransmission,
an SL retransmission of a first transmission block (TB),
a new SL transmission of a second TB different from the first TB,
a long term resource reservation for future transmission of different one or more TBs,
a resource reservation for future transmission of a fixed number of future TBs, or
a resource reservation for an initial transmission of a TB using a standalone advanced control signal preceding initial transmission of the TB; and
selecting a first resource in the shared channel to use for a first SL transmission by the first UE based on the signal power threshold.

10. The first UE of claim 9, wherein the first UE is further caused to perform:
measuring a signal power in the shared channel in respect of a second resource indicated in the resource reservation, and wherein the selecting the first resource to use for the first SL transmission by the first UE comprises:
excluding the second resource indicated in the resource reservation if the signal power exceeds the signal power threshold.

11. The first UE of claim 9, wherein the priority indicates a priority level of data for the SL transmission by the second UE, and wherein the determining the signal power threshold comprises:

adjusting the priority associated with the second SL transmission by the second UE based on the reservation type of the second SL transmission indicated in the resource reservation to obtain an adjusted priority; and
selecting the signal power threshold by mapping the adjusted priority to a respective signal power threshold.

12. The first UE of claim 10, wherein a set of candidate resources are predefined for the shared channel, and wherein the excluding the second resource indicated in the resource reservation comprises:
excluding the second resource from the set of candidate resources, and
wherein the selecting the first resource in the shared channel for the first SL transmission by the first UE comprises:
selecting the first resource from candidate resources remaining in the set of candidate resources.

13. The first UE of claim 12, wherein the first resource includes a time/frequency resource.

14. The first UE of claim 9, wherein the signal further indicates a resource reservation type that corresponds to the reservation type of the second SL transmission.

15. The first UE of claim 9, wherein the shared channel is a shared data channel, and the signal is included in information received over a shared control channel; or
wherein the shared channel is a physical sidelink shared channel (PSSCH), and wherein the signal is a demodulation reference signal (DMRS).

16. The first UE of claim 9, wherein the first UE is further caused to perform:
sending, using the communication subsystem, a first signal indicating a first resource reservation for the first SL transmission by the first UE.

17. The first UE of claim 9 wherein the first UE is further caused to perform:
sensing the signal from the second UE within a time-based sensing window.

18. A non-transitory computer readable medium having instructions stored thereon that, when executed by a first user equipment (UE), cause the first UE to perform operations, the operations comprising:
sensing, using a communication subsystem, a signal from a second UE, the signal indicating a resource reservation for a shared channel for a second sidelink (SL) transmission by the second UE and a priority associated with the second SL transmission;
determining a signal power threshold based on a reservation type of the second SL transmission and the priority, the reservation type being one of a plurality of reservation types, each reservation type of the plurality of reservation types corresponding to a different signal power threshold, the plurality of reservation types including at least two of:
a non-feedback-based SL retransmission,
a feedback-based SL retransmission,
an SL retransmission of a first transmission block (TB),
a new SL transmission of a second TB different from the first TB,
a long term resource reservation for future transmission of different one or more TBs,
a resource reservation for future transmission of a fixed number of future TBs, or
a resource reservation for an initial transmission of a TB using a standalone advanced control signal preceding initial transmission of the TB; and selecting a first resource in the shared channel to use for a first SL transmission by the first UE based on the signal power threshold.

\* \* \* \* \*